(12) United States Patent
Gonzalez Franco et al.

(10) Patent No.: US 12,161,934 B2
(45) Date of Patent: Dec. 10, 2024

(54) MOBILE HAPTIC ROBOTS

(71) Applicant: Microsoft Technology Licensing, LLC, Redmond, WA (US)

(72) Inventors: Mar Gonzalez Franco, Seattle, WA (US); Eyal Ofek, Redmond, WA (US); Michael Jack Sinclair, Redmond, WA (US); Ryo Suzuki, Calgary (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 339 days.

(21) Appl. No.: 17/356,513

(22) Filed: Jun. 24, 2021

(65) Prior Publication Data

US 2022/0409996 A1     Dec. 29, 2022

(51) Int. Cl.
*A63F 13/285*     (2014.01)
*G06F 3/01*     (2006.01)

(52) U.S. Cl.
CPC ............ *A63F 13/285* (2014.09); *G06F 3/011* (2013.01); *G06F 3/016* (2013.01); *A63F 2300/8082* (2013.01); *G05B 2219/32246* (2013.01); *G05B 2219/45064* (2013.01)

(58) Field of Classification Search
CPC ........... A63F 13/285; A63F 2300/8082; G06F 3/011; G06F 3/016; G05B 2219/32246; G05B 2219/45064
See application file for complete search history.

(56) References Cited

U.S. PATENT DOCUMENTS

| | | | |
|---|---|---|---|
| 7,239,306 B2 | 7/2007 | Faahraeus et al. | |
| 9,836,117 B2* | 12/2017 | Shapira | B64C 39/024 |
| 10,675,766 B1* | 6/2020 | Niemeyer | B25J 13/025 |
| 10,845,879 B2* | 11/2020 | Pohl | G06F 3/011 |
| 11,352,135 B2* | 6/2022 | McLean | G06F 3/014 |
| 2006/0155388 A1* | 7/2006 | Pietrzyk | B25J 9/1617 700/2 |
| 2009/0231287 A1* | 9/2009 | Rogowitz | G06F 3/016 345/173 |
| 2011/0077773 A1* | 3/2011 | Yu | B25J 13/08 700/253 |
| 2016/0054837 A1* | 2/2016 | Stafford | G02B 27/01 463/33 |
| 2017/0282090 A1* | 10/2017 | Chen | A63H 33/046 |
| 2018/0067543 A1* | 3/2018 | Sinclair | G06F 3/016 |
| 2018/0157317 A1* | 6/2018 | Richter | G06T 19/006 |
| 2019/0041988 A1* | 2/2019 | Pohl | G06F 3/011 |

(Continued)

OTHER PUBLICATIONS

Ryo Suzuki et al. 2019. ShapeBots: Shape-changing Swarm Robots. In Proceedings of the 32nd Annual ACM Symposium on User Interface Software and Technology (UIST '19). Association for Computing Machinery, New York, NY, USA, 493-505. (Year: 2019).*

(Continued)

*Primary Examiner* — Justin L Myhr
*Assistant Examiner* — Carl V Larsen
(74) *Attorney, Agent, or Firm* — Rainier Patents, P.S.

(57) ABSTRACT

The present concepts relate to devices that can approximate virtual objects when touched by a user. One example device can include a location assembly configured to sense a location of the device on a surface and configured to move the robotic device on the surface and a shape assembly secured to the location assembly and configured to adjust a height and a pitch of an upper surface of the robotic device.

15 Claims, 14 Drawing Sheets

(56) References Cited

U.S. PATENT DOCUMENTS

| | | | | |
|---|---|---|---|---|
| 2019/0279284 | A1* | 9/2019 | Sunday | G06T 19/006 |
| 2020/0387223 | A1* | 12/2020 | Gonzalez Franco | A63F 13/24 |
| 2021/0162585 | A1* | 6/2021 | Yang | B25J 9/08 |

OTHER PUBLICATIONS

Yan Yixian et al. 2020. ZoomWalls: Dynamic Walls that Simulate Haptic Infrastructure for Room-scale VR World. In Proceedings of the 33rd Annual ACM Symposium on User Interface Software and Technology (UIST '20). Association for Computing Machinery, New York, NY, USA, 223-235. (Year: 2020).*

B. T. Kirby et al., "A modular robotic system using magnetic force effectors," 2007 IEEE/RSJ International Conference on Intelligent Robots and Systems, San Diego, CA, USA, 2007, pp. 2787-2793, doi: 10.1109/IROS.2007.4399444. (Year: 2007).*

W. Hong, S. Wang and D. Shui, "Reconfigurable robot system based on electromagnetic design," Proceedings of 2011 International Conference on Fluid Power and Mechatronics, Beijing, China, 2011, pp. 570-575 (Year: 2011).*

Yiwei Zhao, Lawrence H. Kim, Ye Wang, Mathieu Le Goc, and Sean Follmer. 2017. Robotic Assembly of Haptic Proxy Objects for Tangible Interaction and Virtual Reality. In Proceedings of the 2017 ACM International Conference on Interactive Surfaces and Spaces (ISS '17). 82-91. (Year: 2017).*

"1000:1 Micro Metal Gearmotor HP 6V", Retrieved from: https://web.archive.org/web/20210120005623/https://www.pololu.com/product/1595, Jan. 20, 2021, 13 Pages.

"DRV8833 Dual Motor Driver Carrier", Retrieved from: https://web.archive.org/web/20210308025818/https://www.pololu.com/product/2130, Mar. 8, 2021, 9 Pages.

Abtahi, et al., "Beyond the force: Using quadcopters to appropriate objects and the environment for haptics in virtual reality", in Proceedings of CHI Conference on Human Factors in Computing Systems, May 4, 2019, pp. 1-13.

Abtahi, et al., "Visuo-Haptic Illusions for Improving the Perceived Performance of Shape Displays", in Proceedings of the CHI Conference on Human Factors in Computing Systems, Apr. 21, 2018, pp. 1-13.

Araujo, et al., "Snake Charmer: Physically Enabling Virtual Objects", in Proceedings of the Tenth International Conference on Tangible, Embedded, and Embodied Interaction, Feb. 14, 2016, pp. 218-226.

Arora, et al., "VirtualBricks: Exploring a Scalable, Modular Toolkit for Enabling Physical Manipulation in VR", in Proceedings of the CHI Conference on Human Factors in Computing Systems, May 4, 2019, pp. 1-12.

Azmandian, et al., "Haptic Retargeting: Dynamic Repurposing of Passive Haptics for Enhanced Virtual Reality Experiences", in Proceedings of the CHI Conference on Human Factors in Computing Systems, May 7, 2016, pp. 1968-1979.

Benko, et al., "NormalTouch and TextureTouch: High-fidelity 3D Haptic Shape Rendering on Handheld Virtual Reality Controllers", in Proceedings of the 29th Annual Symposium on User Interface Software and Technology, Oct. 16, 2016, pp. 717-728.

Berg, et al., "Reciprocal velocity obstacles for real-time multi-agent navigation", in Proceedings of IEEE International Conference on Robotics and Automation, May 19, 2008, pp. 1928-1935.

Berger, et al., "The uncanny valley of haptics", in Journal of Science Robotics, vol. 3, Issue 17, Apr. 2018, 13 Pages.

Brave, et al., "Tangible interfaces for remote collaboration and communication", in Proceedings of the ACM conference on Computer supported cooperative work, Nov. 1, 1998, pp. 169-178.

Chen, et al., "Augmenting Static Visualizations with PapARVis Designer", in Proceedings of the CHI Conference on Human Factors in Computing Systems, Apr. 2020, pp. 1-12.

Cheng, et al., "Sparse Haptic Proxy: Touch Feedback in Virtual Environments Using a General Passive Prop", in Proceedings of the CHI Conference on Human Factors in Computing Systems, May 6, 2017, 11 Pages.

Cheng, et al., "TurkDeck: Physical Virtual Reality Based on People", in Proceedings of the 28th Annual ACM Symposium on User Interface Software & Technology, Nov. 11, 2015, pp. 417-426.

Choi, et al., "Claw: A Multifunctional Handheld Haptic Controller for Grasping, Touching, and Triggering in Virtual Reality-", in Proceedings of the CHI Conference on Human Factors in Computing Systems, Apr. 21, 2018, pp. 1-13.

Choi, et al., "Grabity: A Wearable Haptic Interface for Simulating Weight and Grasping in Virtual Reality", in Proceedings of 30th Annual ACM Symposium on User Interface Software and Technology, Oct. 22, 2017, pp. 119-130.

Choi, et al., "Wolverine: A wearable haptic interface for grasping in virtual reality", in Proceedings of IEEE/RSJ International Conference on Intelligent Robots and Systems (IROS), Oct. 9, 2016, pp. 986-993.

Everitt, et al., "3D Printed Deformable Surfaces for Shape-Changing Displays", in Journal of Frontiers in Robotics and AI, Aug. 28, 2019, 13 Pages.

Fang, et al., "Wireality: Enabling Complex Tangible Geometries in Virtual Reality with Worn Multi-String Haptics", in Proceedings of the CHI Conference on Human Factors in Computing Systems, Apr. 25, 2020, pp. 1-10.

Follmer, et al., "inFORM: Dynamic Physical Affordances and Constraints Through Shape and Object Actuation", in Proceedings of the 26th Annual ACM Symposium on User Interface Software and Technology, Oct. 8, 2013, pp. 417-426.

Fuste, et al., "Kinetic AR: A Framework for Robotic Motion Systems in Spatial Computing", in Extended Abstracts of the CHI Conference on Human Factors in Computing Systems, Apr. 2020, pp. 1-8.

Goc, et al., "Zooids: Building blocks for swarm user interfaces", in Proceedings of the 29th Annual Symposium on User Interface Software and Technology, Oct. 16, 2016, pp. 97-109.

Gonzalez, et al., "Reach+: Extending the Reachability of Encountered-type Haptics Devices through Dynamic Redirection in VR", in Proceedings of the 33rd Annual ACM Symposium on User Interface Software and Technology, Oct. 20, 2020, pp. 236-248.

Guinness, et al., "RoboGraphics: Dynamic Tactile Graphics Powered by Mobile Robots", in Proceedings of the 21st International ACM SIGACCESS Conference on Computers and Accessibility, Oct. 28, 2019, pp. 318-328.

Hayward, et al., "Haptic Interfaces and Devices", in Sensor Review Journal, vol. 24, No. 1, Mar. 2004, pp. 16-29.

He, et al., "Physhare: sharing physical interaction in virtual reality", in Proceedings of the 30th Annual ACM Symposium on User Interface Software and Technology, Oct. 22, 2017, pp. 17-19.

Heo, et al., "Thor's hammer: An ungrounded force feedback device utilizing propeller-induced propulsive force", in Proceedings of the CHI Conference on Human Factors in Computing Systems, Apr. 21, 2018, pp. 1-11.

Hettiarachchi, et al., "Annexing Reality: Enabling Opportunistic Use of Everyday Objects as Tangible Proxies in Augmented Reality", in Proceedings of the CHI Conference on Human Factors in Computing Systems, May 7, 2016, pp. 1957-1967.

Hoppe, et al., "VRHapticDrones: Providing Haptics in Virtual Reality through Quadcopters", InProceedings of the 17th International Conference on Mobile and Ubiquitous Multimedia, Nov. 25, 2018, pp. 7-18.

Huang, et al., "Haptic-go-round: A Surrounding Platform for Encounter-type Haptics in Virtual Reality Experiences", in Proceedings of the CHI Conference on Human Factors in Computing Systems, Apr. 25, 2020, pp. 1-10.

Insko, et al., "Passive Haptics Significantly Enhances Virtual Environments", in Doctoral Dissertation of University of North Carolina, Apr. 1, 2001, 111 Pages.

Iwata, et al., "Project FEELEX: Adding Haptic Surface to Graphics", in Proceedings of the Annual Conference on Computer Graphics and Interactive Techniques, Aug. 12, 2001, 7 Pages.

Iwata, Hiroo, "Walking about virtual environments on an infinite floor", in Proceedings IEEE Virtual Reality, Mar. 13, 1999, pp. 286-293.

(56) References Cited

OTHER PUBLICATIONS

Kim, et al., "G-raff: an elevating tangible block for spatial tabletop interaction", in Proceedings of the 33rd Annual ACM Conference on Human Factors in Computing Systems, Apr. 18, 2015, pp. 4161-4164.
Zhu, et al., "HapTwist: creating interactive haptic proxies in virtual reality using low-cost twistable artefacts", in Proceedings of the CHI Conference on Human Factors in Computing Systems, May 2, 2019, pp. 1-13.
Kim, et al., "SwarmHaptics: Haptic Display with Swarm Robots", in Proceedings of the CHI Conference on Human Factors in Computing Systems, May 4, 2019, pp. 1-13.
Kim, et al., "Ubiswarm: Ubiquitous robotic interfaces and investigation of abstract motion as a display", in Proceedings of the ACM on Interactive, Mobile, Wearable and Ubiquitous Technologies, vol. 1, No. 3, Sep. 2017, 20 Pages.
Kohli, et al., "Combining Passive Haptics with Redirected Walking", in Proceedings of the International Conference on Augmented Tele-existence, Dec. 5, 2005, pp. 253-254.
Kovacs, et al., "Haptic PIVOT: On-Demand Handhelds in VR", in Proceedings of the 33nd Annual ACM Symposium on User Interface Software and Technology, Oct. 20, 2020, pp. 1046-1059.
Lee, et al., "Molebot: mole in a table", in ACM SIGGRAPH Emerging Technologies, Aug. 7, 2011, 1 Page.
Lee, et al., "Torc: A Virtual Reality Controller for In-Hand High-Dexterity Finger Interaction", in Proceedings of CHI Conference on Human Factors in Computing Systems, May 4, 2019, pp. 1-13.
Leithinger, et al., "Shape displays: Spatial interaction with dynamic physical form", in Journal of IEEE computer graphics and applications vol. 35, Issue 5, Sep. 23, 2015, pp. 5-11.
Leithinger, et al., "Sublimate: State-Changing Virtual and Physical Rendering to Augment Interaction with Shape Displays", in Proceedings of ACM SIGCHI Conference on Human Factors in Computing Systems, Apr. 27, 2013, 10 Pages.
Lopes, et al., "Impacto: Simulating physical impact by combining tactile stimulation with electrical muscle stimulation", in Proceedings of the 28th Annual ACM Symposium on User Interface Software & Technology, Nov. 5, 2015, pp. 11-19.
McNeely, William A.,, "Robotic graphics: a new approach to force feedback for virtual reality", in Proceedings of IEEE Virtual Reality Annual International Symposium,, Sep. 18, 1993, pp. 336-341.
Nakagaki, et al., "Hermits: Dynamically Reconfiguring the Interactivity of Self-Propelled TUIs with Mechanical Shell Add-ons", in Proceedings of the 33rd Annual ACM Symposium on User Interface Software and Technology, Oct. 20, 2020, pp. 882-896.
Nakagaki, et al., "InFORCE: Bi-directionalForce'Shape Display for Haptic Interaction", in Proceedings of the Thirteenth International Conference on Tangible, Embedded, and Embodied Interaction, Mar. 17, 2019, pp. 615-623.
Narazani, et al., "Extending AR Interaction through 3D Printed Tangible Interfaces in an Urban Planning Context", in the Adjunct Publication of the 32nd Annual ACM Symposium on User Interface Software and Technology, Oct. 2019, pp. 116-118.
Patten, et al., "Mechanical constraints as computational constraints in tabletop tangible interfaces", in Proceedings of the SIGCHI conference on Human factors in computing systems, Apr. 29, 2007, pp. 809-818.
Rasmussen, et al., "Shape-changing interfaces: a review of the design space and open research questions", in Proceedings of the SIGCHI Conference on Human Factors in Computing Systems, May 5, 2012, pp. 735-744.
Elodie, et al., ""Can I Touch This?": Survey of Virtual Reality Interactions via Haptic Solutions", in Repository of arXiv:2101.11278v1, Jan. 27, 2021, 16 Pages.

"International Search Report and Written Opinion Issued in PCT Application No. PCT/US22/030449", Mailed Date: Sep. 7, 2022, 12 Pages.
Zhenyi, et al., "Robotic Haptic Proxies for Collaborative Virtual Reality", in Repository of arXiv:1701.08879v1, Jan. 31, 2017, 7 Pages.
Sinclair, et al., "CapstanCrunch: a Haptic VR Controller with User-supplied Force Feedback", Oct. 20, 2019, pp. 815-829.
Siu, et al., "Shapeshift: 2D spatial manipulation and self-actuation of tabletop shape displays for tangible and haptic interaction", in Proceedings of the CHI Conference on Human Factors in Computing Systems, Apr. 21, 2018, pp. 1-13.
Stemasov, et al., "Mix&Match: Towards Omitting Modelling Through In-situ Remixing of Model Repository Artifacts in Mixed Reality", in Proceedings of the CHI Conference on Human Factors in Computing Systems, Apr. 25, 2020, pp. 1-12.
Sun, et al., "PaCaPa: a handheld vr device for rendering size, shape, and stiffness of virtual objects in tool-based interactions", in Proceedings of the CHI Conference on Human Factors in Computing Systems, May 2, 2019, pp. 1-12.
Suzuki, et al., "Reactile: Programming Swarm User Interfaces through Direct Physical Manipulation", in Proceedings of the CHI Conference on Human Factors in Computing Systems, Apr. 21, 2018, pp. 1-13.
Suzuki, et al., "RoomShift: Room-scale Dynamic Haptics for VR with Furniture-moving Swarm Robots", "in Proceedings of the CHI Conference on Human Factors in ComputingSystems", Apr. 21, 2020, pp. 1-11.
Suzuki, et al., "ShapeBots: Shape-changing Swarm Robots", in Proceedings of the 32nd Annual ACM Symposium on User Interface Software and Technology, Oct. 20, 2019, pp. 493-505.
Takei, et al., "Kinereels: extension actuators for dynamic 3d shape", In ACM SIGGRAPH, Aug. 7, 2011, 1 Page.
Teng, et al., "PuPoP: Pop-up Prop on Palm for Virtual Reality", in Proceedings of the 31st Annual ACM Symposium on User Interface Software and Technology, Oct. 11, 2018, pp. 5-17.
Teng, et al., "TilePoP: Tile-type Pop-up Prop for Virtual Reality", in Proceedings of the 32nd Annual ACM Symposium on User Interface Software and Technology, Oct. 20, 2019, pp. 639-649.
Vonach, et al., "VRRobot: Robot actuated props in an infinite virtual environment", in Journal of IEEE Virtual Reality, Mar. 18, 2017,10 Pages.
Wang, et al., "MoveVR: Enabling Multiform Force Feedback in Virtual Reality using Household Cleaning Robot", in Proceedings of the CHI Conference on Human Factors in Computing Systems, Apr. 25, 2020, pp. 1-12.
Yixian, et al., "ZoomWalls: Dynamic Walls that Simulate Haptic Infrastructure for Room-scale VR Worlds", "in Proceedings of the 33rd Annual ACM Symposium on User Interface Software andTechnology", Oct. 20, 2020 , pp. 223-235.
Yokohji, et al., "Designing an encountered-type haptic display for multiple fingertip contacts based on the observation of human grasping behaviors", in the International Journal of Robotics Research, vol. 24, Issue 9, Sep. 2005, pp. 717-729.
Zhao, et al., "Robotic assembly of haptic proxy objects for tangible interaction and virtual reality", in Proceedings of the ACM International Conference on Interactive Surfaces and Spaces, Oct. 17, 2017, pp. 82-91.
"IZOKEE Development Board for ESP8266 ESP-12F 4M Bytes WLAN WiFi Internet Development Board Compatible with Arduino (Pack of 5)", Retrieved from: https://www.amazon.com/gp/product/B076F52ND/ref=ppx_yo_dt_b_asin_title_009_s00?ie=UTF8&psc=1, Retrieved date: Sep. 22, 2020, 15 Pages.
Razzaque, et al. "Redirected Walking", in Proceedings of Eurographics, vol. 9, Sep. 2001, 6 Pages.

\* cited by examiner

SCENARIO 100

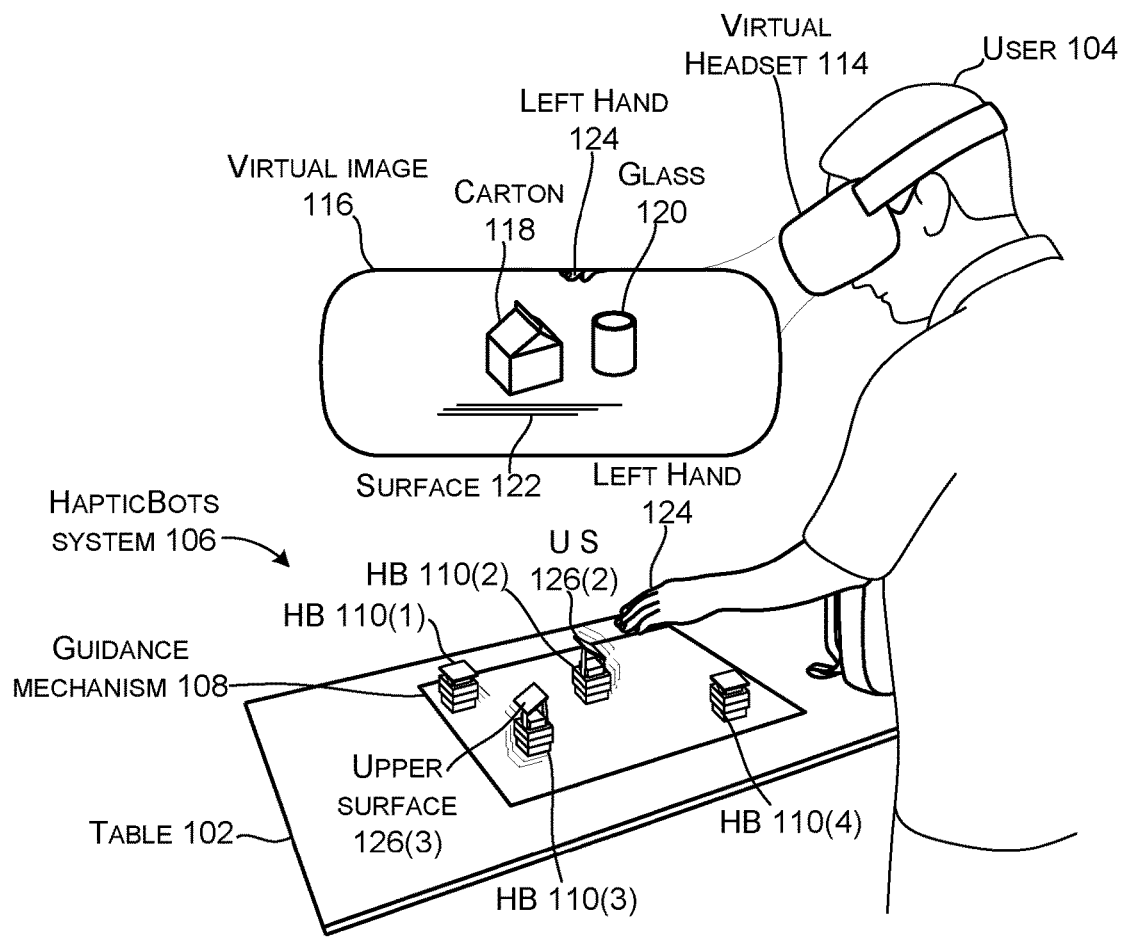
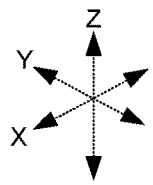
FIG. 1D

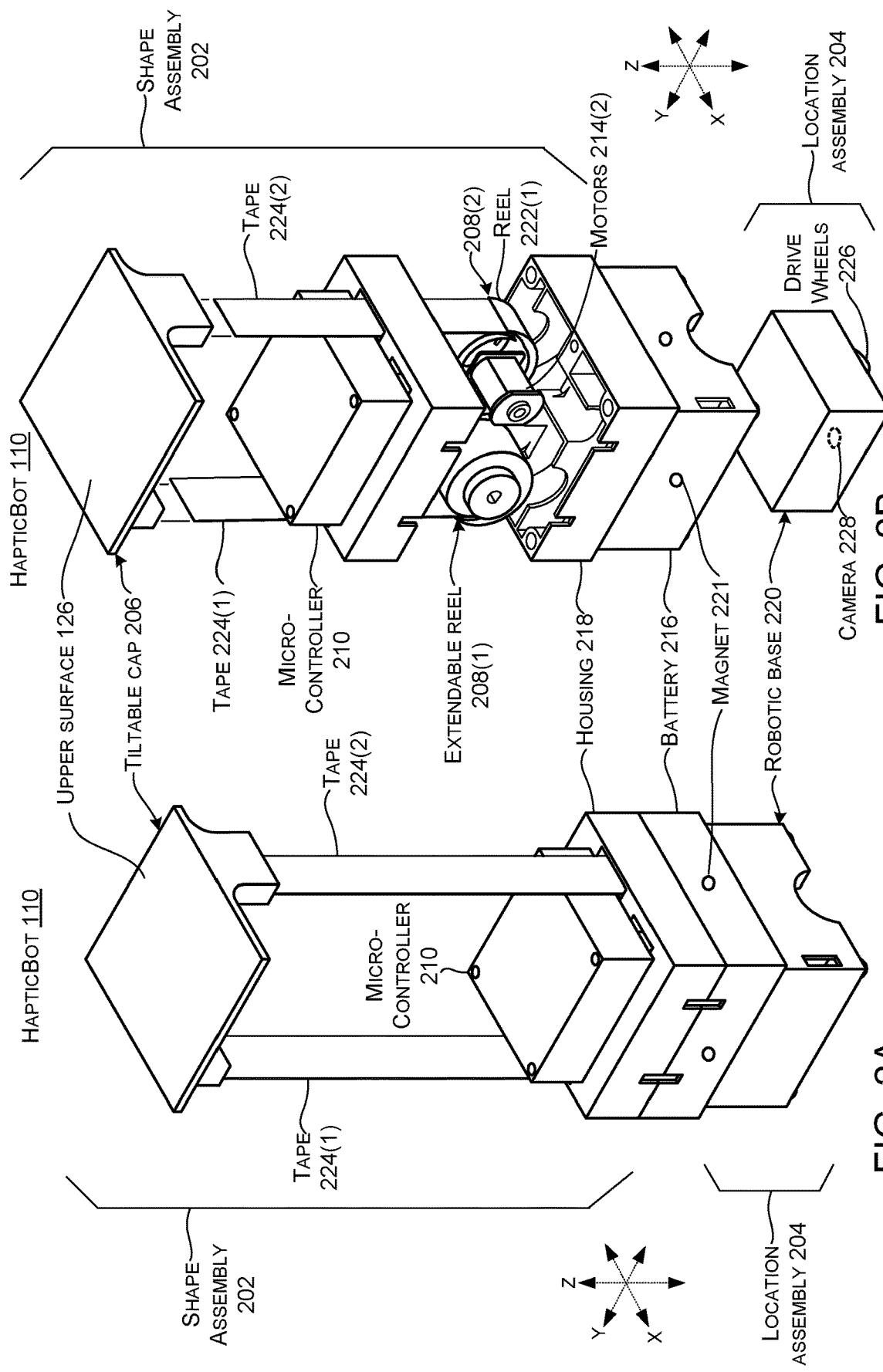

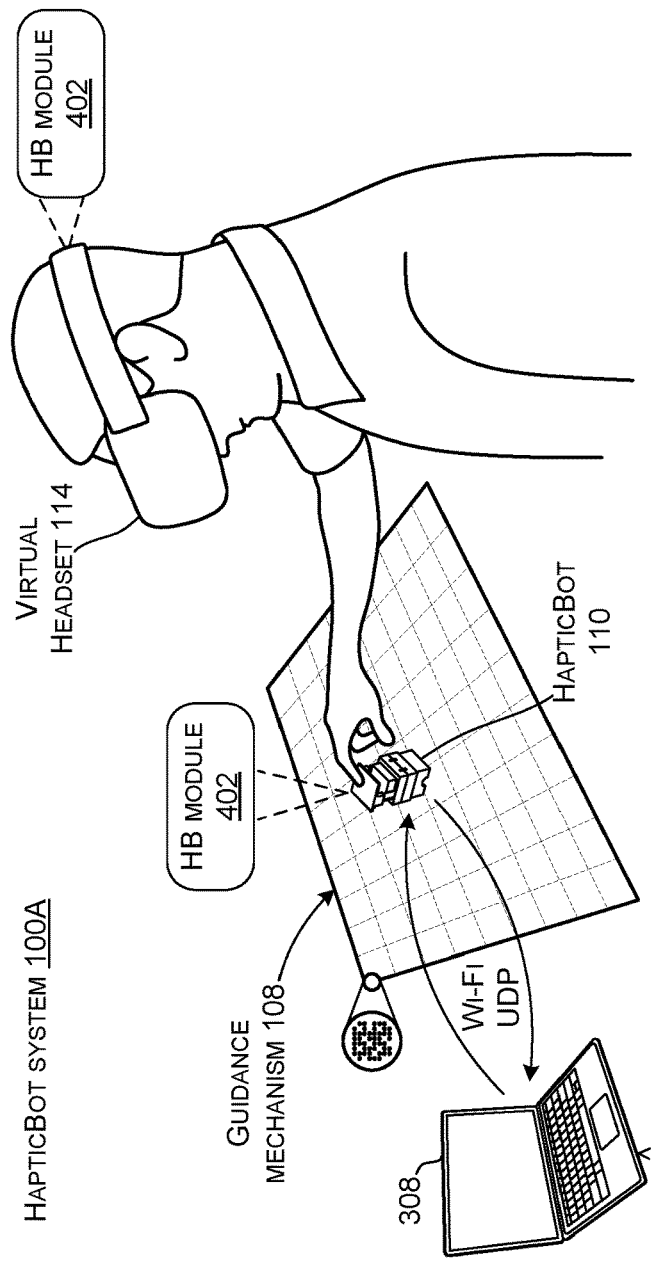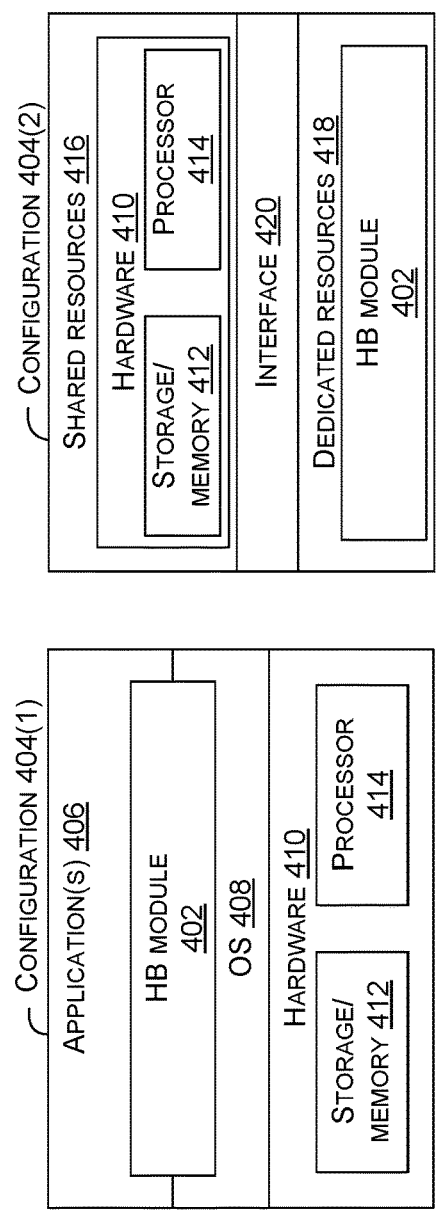
FIG. 4

MOBILE HAPTIC ROBOTS

BACKGROUND

In real life, humans tend to use their hands to interact with objects. They tend to reach out for objects, touch, grasp, manipulate, and release them. Many virtual reality systems provide haptic feedback so that users can touch and/or grab objects of different shapes. These systems tend to employ two types of haptic devices. The first type tends to be held or worn, such as gloves. These devices can provide haptic sensations, but cannot create a grounding sensation of pushing against an object. The second type of device tends to be complex stationary devices that are not readily moveable or if they are moveable, they require extensive take down, setup, and re-calibration. The present concepts can relate to these and/or other shortcomings of existing technologies.

BRIEF DESCRIPTION OF THE DRAWINGS

The accompanying drawings illustrate some implementations of the present concepts. Features of the illustrated implementations can be more readily understood by reference to the following descriptions in conjunction with the accompanying drawings. Like reference numbers in the various drawings are used where feasible to indicate like elements. In some cases, parentheticals and/or suffixes are utilized after a reference number to distinguish like elements. Use of the reference number without the associated parenthetical is generic to the element. The accompanying drawings are not necessarily drawn to scale. In the figures, the left-most digit of a reference number identifies the figure in which the reference number first appears. The use of similar reference numbers in different instances in the description and the figures may indicate similar or identical items.

FIGS. 1A-1G, 2A, 5A, 5B, 7C, and 8 are perspective views relating to example implementations of the present concepts.

FIG. 2B is an exploded perspective view corresponding to FIG. 2A.

FIG. 4 is a system diagram of an example implementation that is consistent with at least some of the present concepts

DETAILED DESCRIPTION

Figure 1A:
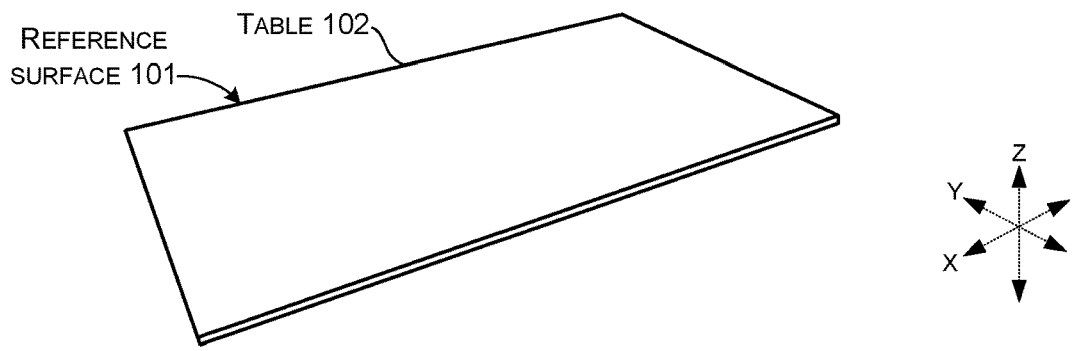

The present concepts relate to haptic feedback provided by smarming, independently-controllable haptic robots (e.g., HapticBots). HapticBots can provide a novel encountered-type haptic approach for virtual reality (VR) based on multiple tabletop-size shape-changing HapticBots. These HapticBots can move on a tabletop or other surface and can change their height and orientation to haptically render various surfaces and objects on-demand. Compared to previous encountered-type haptic approaches like shape displays or robotic arms, HapticBots offer an advantage in deployability, scalability, and generalizability—these HapticBots can be easily deployed due to their compact form factor. They can support multiple concurrent touch points in a large area thanks to the distributed nature of the HapticBots. The present concepts can offer a novel set of interactions enabled by these HapticBots which can include: 1) rendering haptics for VR objects by providing just-in-time touch-points on the user's hand, 2) simulating continuous surfaces with the concurrent height and position change, and/or 3) enabling the user to pick up and move VR objects through graspable proxy objects (e.g., HapticBots). HapticBots can be employed in various scenarios, such as with various applications, including remote collaboration, education and training, design and 3D modeling, and/or gaming and entertainment, among others.

HapticBots concepts can provide effective haptic feedback that can enrich virtual reality (VR) experiences in many application domains. Supporting general-purpose haptic feedback has proven to be a difficult challenge. A common approach to providing haptic feedback for VR is to use a hand-held or wearable device. However, these wearable hand-grounded devices are inherently limited in their ability to render a world grounded force, such as surfaces that can be touched or pushed with the user's hand.

To fill this gap, encountered-type haptics are introduced as an alternative approach. In contrast to hand-held or wearable devices, the encountered-type haptics provide haptic sensations through actuated physical environments by dynamically moving physical objects or transforming the physical shape when the user encounters the virtual object.

Different approaches have been developed for encountered-type haptics: from grounded robotic arms (e.g., Snake Charmer, VRRobot) to shape displays (e.g., shapeShift, Feelex, and inForce). However, these existing approaches still face a number of challenges and limitations. For example, shape displays often require large, heavy, and mechanically complex devices, reducing reliability and deployability of the system for use outside research labs. Also, the resolution fidelity and the display's size are still limited, making it difficult to render smooth and continuous surfaces across a large interaction area. Alternately, robotic arms can bring a small piece of a surface to meet the user hand on demand, but the speed at which humans move challenges the ability to cover just in time large interaction spaces with a single device. Scaling the number of robotic arms is also a challenge as complex 3D path planning is required to avoid unnecessary collision with both the user and the other arms.

HapticBots concepts address these challenges via novel 'encountered-type haptics,' which are referred to as distributed encountered-type haptics. Distributed encountered-type haptics can employ multiple shape-changing HapticBots to simulate a consistent physical object that the user can encounter through hands or fingers. By synchronously controlling multiple HapticBots, these HapticBots can approximate different objects and surfaces distributed in a large interaction area.

The HapticBots concepts can enable deployable, scalable, and general-purpose encountered-type haptics for VR, providing a number of advantages compared to the existing approaches, including shape displays, robotic arms, and non-transformable mobile robots. The solution can be deployable in that each HapticBot can be light and compact, making the system portable and easy to deploy. Each HapticBot can be simple and modular and thus solutions can be scaled to increase the number of touch-points and covered area. Moreover, the use of multiple HapticBots can reduce the average distance that an individual HapticBot needs to travel, which reduces the HapticBots' speed requirements. Further, each HapticBot can be general-purpose because its shape-changing capability can allow it to assume many roles. The shape-changing ability of each HapticBot can significantly increase the expressiveness of haptic rendering by transforming itself to closely match with the virtual object on-demand and in real-time. This allows for greater flexibility needed for general-purpose applications.

FIGS. 1A-1G collectively show an example application scenario 100 that involves HapticBots in a virtual reality use case. This scenario can utilize an existing reference surface 101. In this case, the reference surface is a horizontal surface, such as a table 102 as shown in FIG. 1A, however the reference surface is not limited to horizontal orientations.

Figure 1B:
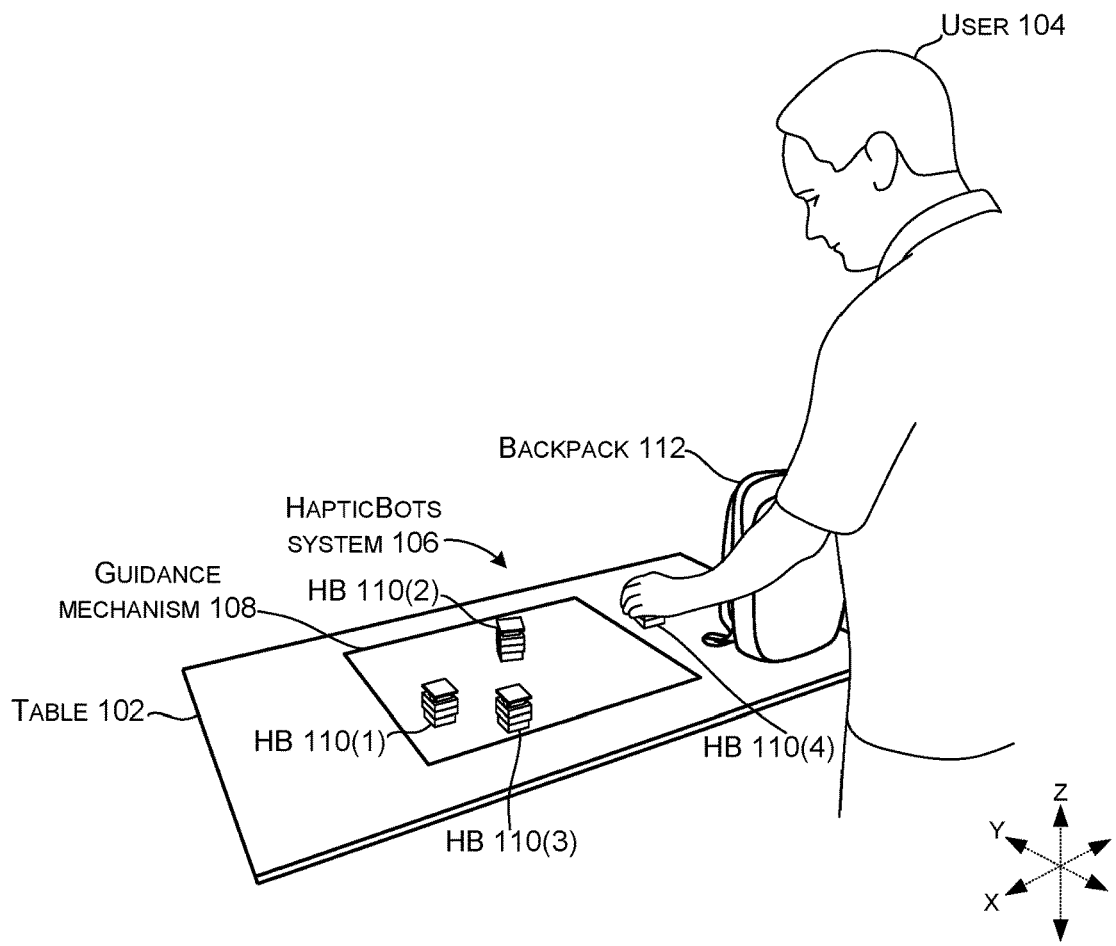

FIG. 1B shows a user 104 approaching the table 102 where the user wants to set up a HapticBots system 106. In this example, the HapticBots system 106 includes a guidance mechanism 108 and multiple independently-controllable haptic robots (e.g., HapticBots) 110. The guidance mechanism 108 can allow the position or location of the HapticBots 110 to be controlled (e.g., in the xy reference plane). The guidance mechanism 108 can also allow an orientation of the HapticBots 110 to be controlled (e.g., which direction they are facing) by rotation either in the clockwise or counterclockwise direction.

This example includes four HapticBots 110(1)-110(4), but other numbers of HapticBots can be employed. The HapticBots system 106 is readily portable and easily deployed and stored as desired. In this case, the user 104 stored and carried the HapticBots system 106 in his backpack 112. The user then laid the guidance mechanism 108 on the table 102 and set the HapticBots 110 on top of the guidance mechanism 108.

Figure 1C:
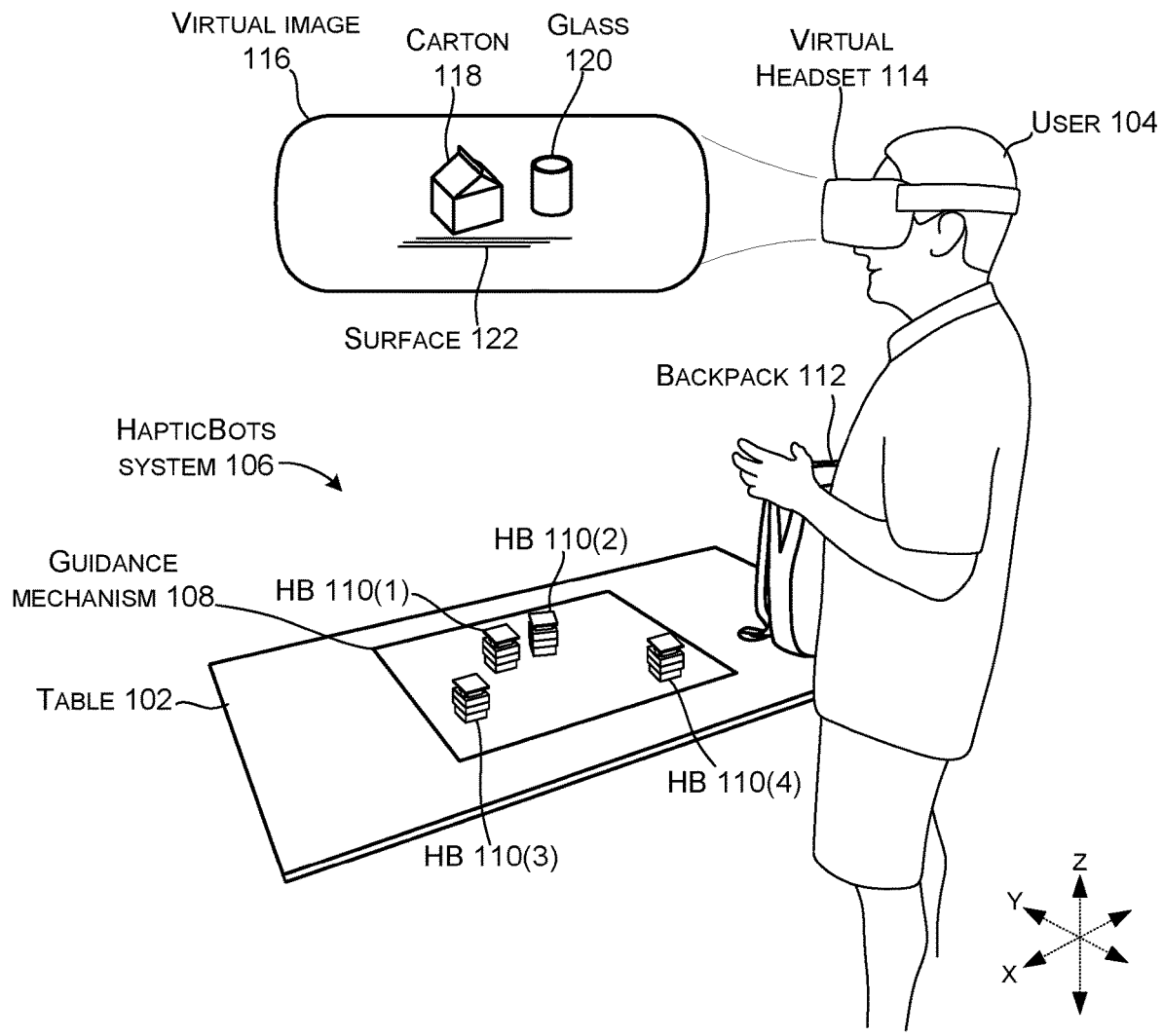

FIG. 1C shows the user 104 after the user removed a virtual reality device in the form of a virtual headset 114 from the backpack 112 and positioned the virtual headset on his head. The virtual headset 114 is now generating a virtual image 116 for the user. Note that the virtual image 116 is shown directly above the table 102 to avoid overlaid images on the drawing page. However, the virtual image 116 would actually appear to the user to be in the same 3D position as the top of the table 102 because the user is looking at the tabletop. In this case, the virtual image 116 includes two virtual objects in the form of a beverage carton 118 and a glass 120 positioned on a surface 122. (As mentioned above, the surface 122 would be aligned in 3D space with the table 102 (e.g., the user would be looking slightly downward as in FIG. 1D rather than straight out as in FIG. 1C).

FIG. 1D is similar to FIG. 1C except that at this point the user is reaching outward in 3D space with his left hand 124. The user movement can be detected with various types of sensors, such as sensors on the virtual headset 114, such as outward looking cameras. Other sensors could be positioned on the user. Still other sensors could be positioned in the environment and pointed toward the table. The HapticBots system 106 can predict where the user is reaching based upon the user movements, such as a trajectory of the user's hand and mapping to any virtual objects in the proximity of the trajectory. The prediction can be improved through visual feedback. For instance, note that the user's left hand 124 is shown in the virtual image. If the 'virtual hand' is offset slightly from the user's intended target, the user will tend to make corrective adjustments to their actual hand.

For purposes of explanation, assume that the prediction indicates that the user is intending to reach for the virtual carton 118. Responsively, the HapticBots system 106 identifies which HapticBots 110 to use to simulate the virtual carton 118. In this example, HapticBots system 106 has determined to use HapticBots 110(2) and 110(3) to simulate the virtual carton. The HapticBots system 106 is moving HapticBots 110(2) and 110(3) toward the location of the virtual carton 118 (e.g., toward the predicted 'destination' of the user's left hand 124 where it would intersect the virtual carton). Simultaneously, HapticBots system 106 is moving HapticBot 110(1) out of the way (e.g., out of the way of the HapticBots 110(2) and 110(3) and out of the way of the trajectory of the user's left hand so the user does not hit it).

The HapticBots system 106 is also making adjustments to HapticBots 110(2) and 110(3) to allow them to collectively simulate (e.g., approximate) the shape of the virtual carton 118. Toward this end, the HapticBots system 106 is adjusting the height and the shape of HapticBots 110(2) and 110(3). Specifically, the upper surfaces 126(2) and 126(3) are being raised and angled away from each other. Thus, from one perspective, in this implementation, the individual HapticBots are moved on the xy reference plane to either participate in the simulation or avoid being in the way. Individual HapticBots can also be adjusted in the z reference direction (e.g., perpendicular to the plane) to better approximate the location and shape of the expected virtual object.

Figure 1E:
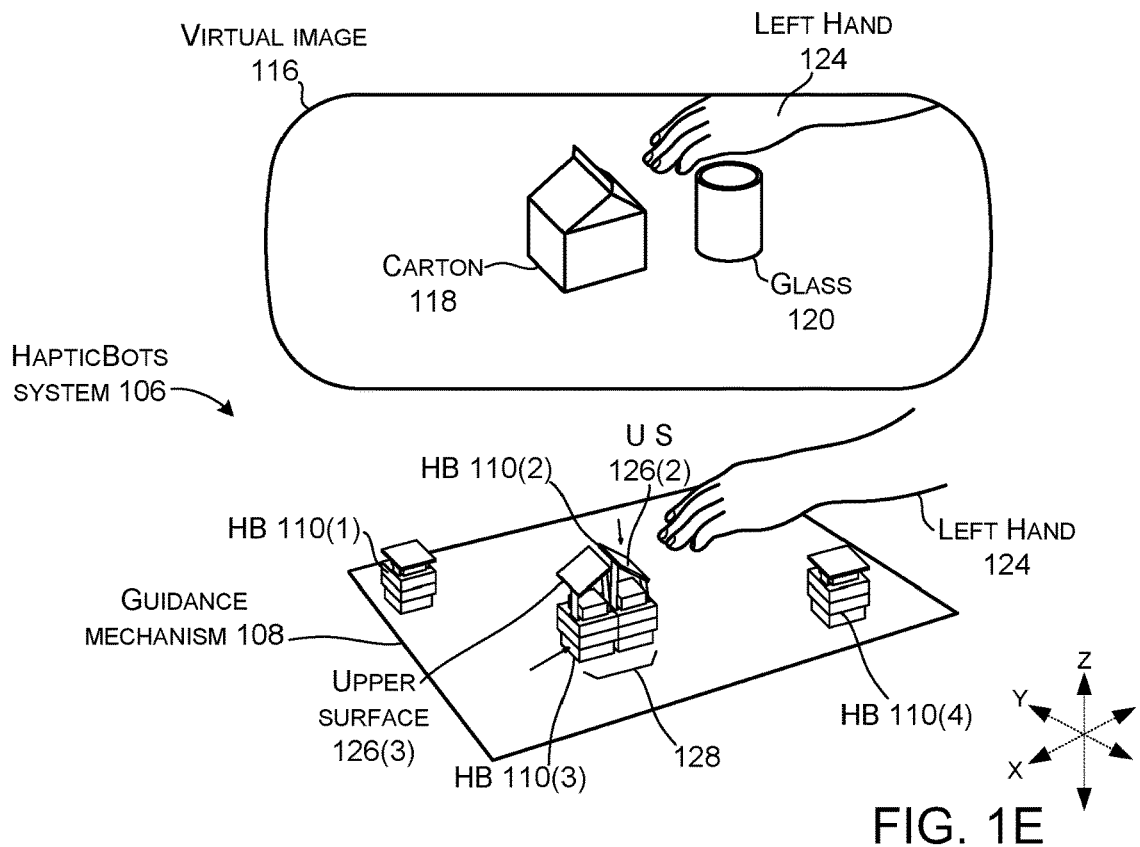

FIG. 1E shows the user's left hand 124 approaching the virtual carton 118. The HapticBots 110(2) and 110(3) are now adjacent to, and touching, one another to collectively simulate the virtual carton 118 as indicated at 128. In some configurations, the HapticBots 110 can include electromagnets (shown and designated relative to FIGS. 2A and 2B) that can be controlled to temporarily secure individual HapticBots together in circumstances, such as this one, where they collectively create a single physical structure.

Figure 1F:
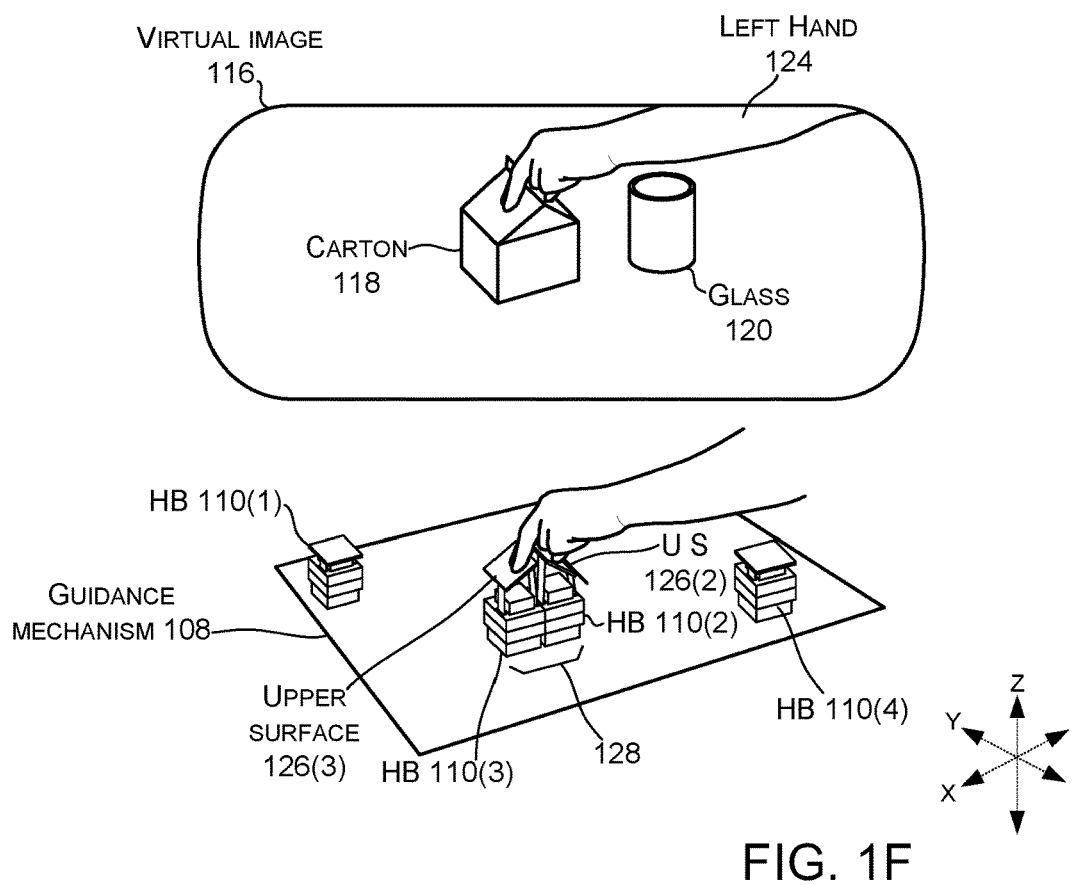

FIG. 1F is similar to FIG. 1E, but at this point, the user's left hand 124 has reached and is touching the upper surfaces 126 at the expected location and shape of the virtual carton 118 in the virtual image 116. The HapticBots 110(2) and 110(3) are now collectively providing haptic feedback that confirms/reaffirms what the user expected to feel at the location of the virtual carton 118. Assume at this point that the HapticBots system 106 predicts that the user will reach (or is reaching) for virtual glass 120 with their right hand 130. The HapticBots system 106 can control one or more of the HapticBots to mimic the virtual glass 120. In this case, assume that the HapticBots system 106 determines that the glass can be simulated with a single HapticBot and selects HapticBot 110(4) to fill this role. The HapticBots system 106 can cause HapticBot 110(4) to move to the 3D location of the virtual glass 120 and adjust its shape (in this case its height) to approximate that of the virtual glass 120.

Figure 1G:
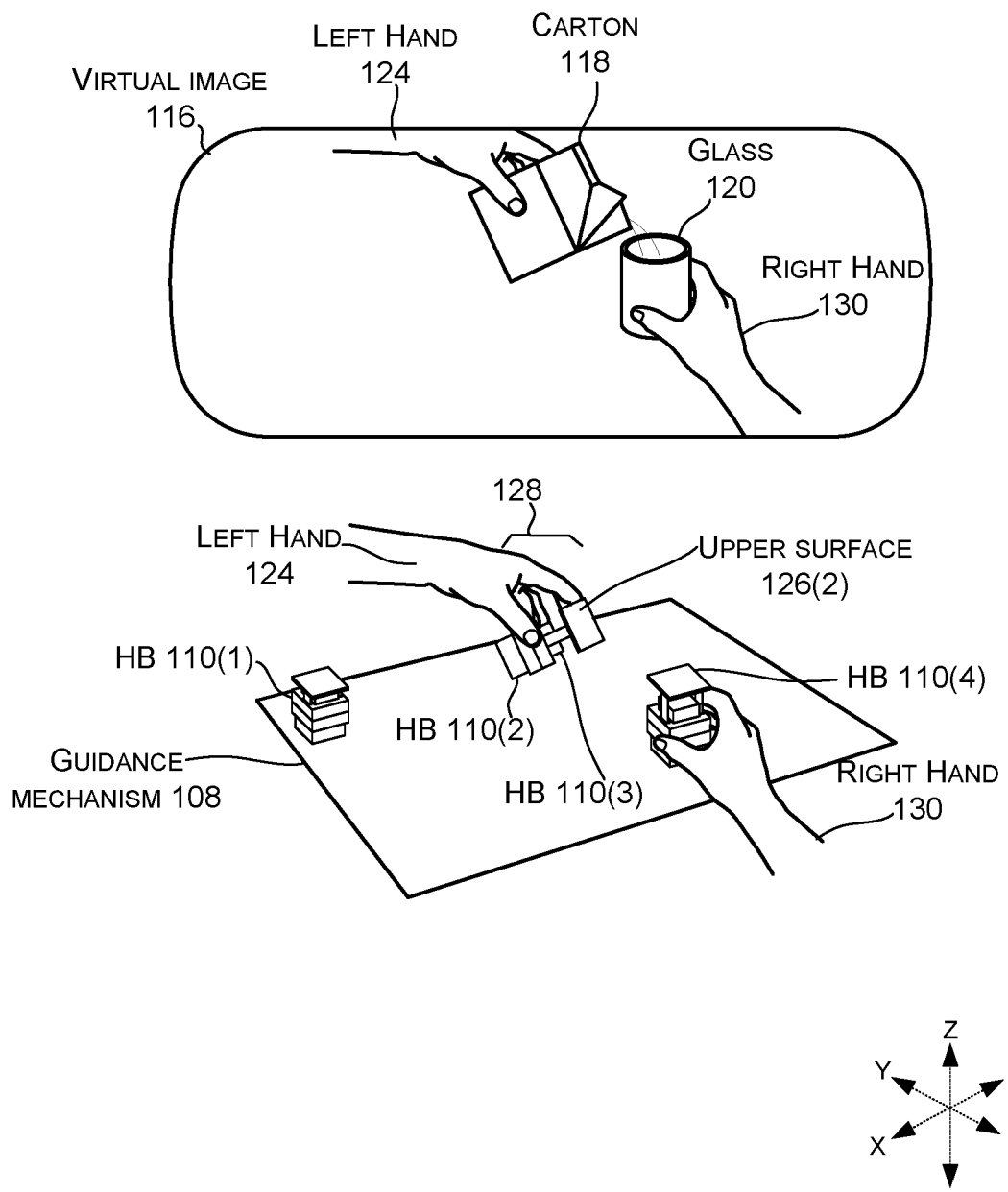

FIG. 1G shows a subsequent point where HapticBot 110(4) has moved to the 3D location of the virtual glass 120 and has been grasped by the user's right hand 130. The height of HapticBot 110(4) has been adjusted to approximate the height of the virtual glass 120. The HapticBot 110(4) has a location, height, and width that approximates the user's visual expectations for the virtual glass 120.

At the same time, the user has grasped and lifted HapticBots 110(2) and 110(3) in a pouring gesture. HapticBots 110(2) and 110(3) collectively mimic the location, size, and shape that approximates the user's visual expectations for the virtual carton 118. When the user is done with the virtual scene, he/she/they can put down the HapticBots. The HapticBots system 106 can re-identify the location of these HapticBots and await the next simulation. Note also, that HapticBots 110(2) and 110(3) are not 'tied' to a particular location. The user can move the HapticBots 110(2) and 110(3) exactly as he/she/they would a real carton in 3D space and then set them back down where ever feels natural. The user does not have to set them back down exactly where he/she/they picked them up. Once the user sets them down, the HapticBots system can use their new location as a starting point for the next virtualization.

Introductory FIGS. 1A-1G illustrate the adaptability of HapticBots systems to provide haptic feedback structures in support of diverse virtual scenarios. First, the HapticBots can be viewed as a swarm where a subset is selected to accomplish a given scenario. In the example above, the swarm was controlled in the horizontal plane (e.g., xy reference plane), with individual HapticBots selected to contribute to specific structures at specific horizontal locations and other HapticBots moved out of the way to avoid interference. Individual HapticBots can be controlled in various ways to approximate a virtual shape. The control can include multiple HapticBots working cooperatively to simulate a virtual object as shown in FIGS. 1E-1G.

The control can also relate to controlling the dimensions (e.g., shape) of an individual HapticBot, such as height, width, and/or surface angles. All of this can be achieved with a relatively small number of HapticBots that 'move to the user' e.g., the points where the user expects to engage a virtual object, rather than being 'everywhere all the time.' This provides a technical solution of a HapticBots system being readily portable and easily deployed haptic feedback system that can simulate an entire scene by moving to and conforming to the specific virtual structures that the user is engaging at any one time.

In recent years, various haptic devices have been explored to enhance the user immersion of VR (virtual reality). One of the most common types of haptic devices is the hand-held or wearable haptic approach. Most hand-held haptic devices render touch sensations of virtual objects by applying differential forces of the fingertips against the opposing thumb. For realizing the dynamic range of the device movement, the fingertip is usually pushed back to stay outside the virtual object until interaction. Only a few devices, can also render forces such as texture and cutaneous shear force of the virtual surface. However, one inherent limitation of such body grounded devices is the lack of generating a convincing world grounded sensation as no perceived force stops the body from moving into virtual objects. Grounding the hands to the body using exoskeletons or strings can aid the grounding perception but are cumbersome and complex.

Alternatively, passive haptics approaches tend to use physical artifacts such as a haptic proxy for VR, so that a VR user can touch and interact with a real object. For example, Annexing Reality employs static physical objects as props in an immersive environment by matching and adjusting the shape/size of the virtual objects. Haptic Retargeting leverages a mismatch in hand-eye coordination in order to guide the user's touch toward the position of physical objects. Similarly, by combining passive objects with redirected walking, some traditional solutions explored haptics that can go beyond the scale of human hands. Using passive objects, one can generate very reasonable haptic sensations. However, as the shape and position of the proxy object in this case is fixed, it has a limited degree of haptic expression. For example, when the position or geometry of the proxy object differs from the displayed virtual object, it can break the illusion. Manual reconfiguration of proxy objects has also been explored, but lacks the capability of dynamically simulating various shapes on demand.

Robotic Encountered-type Haptics have been suggested to overcome this limitation by integrating a passive haptic proxy with mechanical actuation. Encountered-type haptics dynamically positions or transforms the haptic props when the user "encounters" the virtual object. Overall, there are three different approaches that have been explored for tabletop encountered-type haptics: robotic arms, shape displays, and mobile robots.

Robotic arms simulate surfaces by bringing a small patch of a surface to the user's hand wherever he/she/they may touch the virtual surface. Since the real object, virtually rendered, is invisible to the VR user, it can potentially generate the perception that the entire geometry exists in the physical world. However, the need for a robot arm to cover a large interaction space requires a large and fast arm with a long reach which may be heavy and less portable. Also, the requirement for moving the large robotic arm in a volume while the user is blind to it, may limit the speed or movement space of the robot for safety reasons.

The second approach is using shape displays. These systems simulate dynamic surfaces and shapes by constructing the encountered geometry using an array of actuated pins. However, the large number of actuators that are needed to render a shape limits these devices' resolution and makes them complex, expensive, heavy, power hungry, and limited in coverage area.

The third approach uses mobile robots or even drones to move or actuate passive proxy objects. These techniques can employ the tabletop mobile robots to dynamically reposition the attached passive haptic proxy. However, these mobile robots can only render a single predefined object due to the lack of transformation capability. Others have explored assembled haptic proxies of objects using swarm robot. While they assemble the required geometry on demand, it requires significant time to assemble a large object, which limits real-time interaction.

Thus, the existing encountered-type approaches still have many challenges in terms of deployability (portable and deployable form factor), scalability (both an interaction area and the number of touch-points), and generalizability (the variety of shapes and surfaces the system can support). The present concepts provide technical solutions that address these problems by introducing a new class of encountered-type haptics with distributed shape-changing robots.

Figure 3:
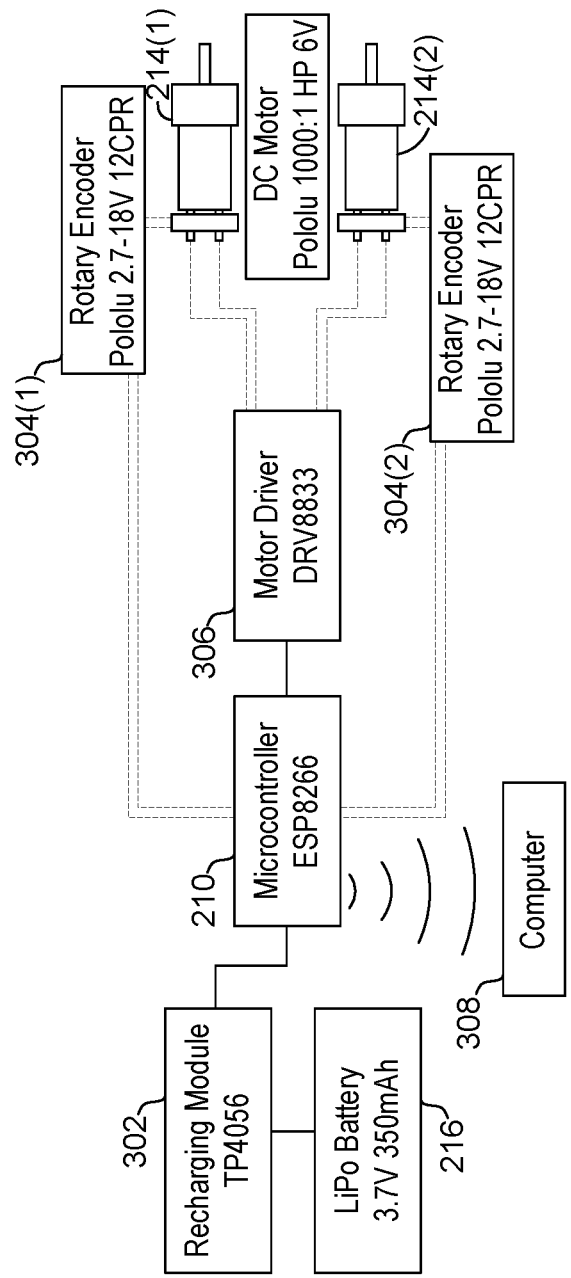
FIG. 3 is a schematic diagram of an example implementation that is consistent with at least some of the present concepts.

The discussion now turns to FIGS. 2A-4 that collectively provide details of an example HapticBot 110 and an example HapticBots system 100A that can include a swarm of HapticBots 110. FIGS. 2A and 2B show components of an example HapticBot. FIG. 3 shows a schematic of electronic components of the example HapticBot. FIG. 4 shows details of an example HapticBots system that can employ a swarm of HapticBots.

FIG. 2A shows a perspective view of example HapticBot 110. FIG. 2B shows a similar exploded view of the example HapticBot 110. In this example for purposes of explanation, the HapticBot can be categorized into a shape assembly or module 202 and a location assembly or module 204. The location assembly 204 can move the HapticBot to desired locations, such as on the xy reference plane. The shape assembly 202 can adjust the shape of the HapticBot 110 to approximate a virtual object at the desired location.

The shape assembly 202 can include a tiltable cap 206, extendable reels 208, a microcontroller 210, shafts (not visible), motors 214, a battery 216, and/or a housing 218. The location assembly 204 can include a robotic base 220. The housing 218 can be secured to the robotic base 220.

Note also, that some implementations can include electromagnets 221, such as in the housing 218 or the robotic base 220. The electromagnets can be controlled to create attractive forces between separate HapticBots that are collectively approximating a virtual object, such as the virtual carton 118 in FIGS. 1E-1G.

This example HapticBot 110 can employ extendable reels 208 to enable a large dynamic range of heights with a compact form factor. The extendable reels 208 can provide 1) mechanical stability of the actuator, which can be essential to provide meaningful force feedback, 2) compact form factor, and 3) fast transformation speed for real-time interactions. Each extendable reel 208(1) and 208(2) can entail a reel or spool 222 and a metal (or other material) tape 224 secured to the reel 222. As used here, a 'tape' can be an elongate band with a lengthwise curve to increase longitudinal stiffness when it is extended (e.g., not wound around the reel 222). The 'tape' can be manifest as the tape or blade of commercially available 'tape measures,' a specific example of which is provided in the discussion below. The reels 222 can be connected to the motors 214 by the shafts and/or gears. Turning the reels 208 one direction retracts the tapes 224 by winding the tapes 224 around the reels 222 and lowering the tiltable cap 206. Turning the reels in the opposite direction extends the tapes 224 and raises the tiltable cap.

One example tape 224 and reel 222 combination can use an off-the-shelf metal tape measure reel 222, such as Crescent Lufkin CS8506 ½ inch×6 inch metal tape measure. The material choice of this tape 224 can be one of the key design considerations as it determines the vertical load-bearing capability. On the other hand, a strong material can make it more difficult for this small DC motor 214 to successfully rotate the reel 222. In this example, the tape has 0.15 mm thickness and is 1.2 cm (½ inch) width wide, and is slightly curved to avoid buckling. This tape measure was cut down to 36 cm.

Terminal ends of the tapes 224 can be pivotably connected to opposing sides of the tiltable cap 206. Controlling the tapes 224 in unison controls the height of the HapticBot in the z direction while maintaining an attitude (e.g., slope, tilt, or pitch) of the tiltable cap 206. Compare for instance, HapticBot 110(4) of FIGS. 1F and 1G where the tiltable cap is extended upward but the pitch remains the same. Controlling the tapes independently can control both the height and the attitude of the HapticBot's tiltable cap 206. See for instance, HapticBot 110(3) of FIGS. 1C-1E, which transitions from zero pitch (e.g., flat to an angle of about 30 degrees). The tiltable cap 206 can define the upper surface 126(3) of FIGS. 1C-1E.

The two retractable metal tapes 224 on motorized extendable reels 208 can occupy a small footprint in the xy plane but can extend and hold their shape while resisting modest loads in certain directions. One example reel-based linear actuator can use compact DC motors 214, such as Pololu 1000:1 Micro Metal Gearmotor HP 6V, Product No. 2373. This example motor 214 has a cross-section of 1.0 cm×1.2 cm and its length is 2.9 cm. The no-load speed of the geared motor 214 is 31 rpm, which extends the metal tape 224 at 2.8 cm/sec. The motor's maximum stall torque is 12 kg cm. The illustrated HapticBot configuration of FIGS. 2A and 2B can accommodate two motors 214 placed side by side to minimize the overall footprint size.

As mentioned above, one implementation can employ two DC motors 214 with shafts and/or potentially intervening gears to individually rotate to extend and retract the reels 222. Each reel 222 can be connected to the tiltable cap 206. The tiltable cap 206 can be made of 3D printed parts (4.7×4.7 cm) and can have a shaft on each side fastened with an M3 screw (2.6 cm in length) and nut to make each end rotatable. By individually controlling the extension length of each tape 224, the upper surface 126 can tilt between −60 to 60 degrees, for example. A rotary encoder 304, such as Pololu Magnetic Encoder Pair Kit, 12 CPR, 2.7-18V, Product No. 4761 can be connected to the motor shaft to continuously measure the position of each reel 222 and hence extension of the tape 224 and tilt of the tiltable cap 206.

In the illustrated configuration, the overall footprint of the HapticBots 110 has a cross-section of 4.7×4.7 cm and 3.0 cm in height. The HapticBots' height can change from a minimum (e.g., fully retracted tape) of 8 cm to a maximum (e.g., fully extended tape) of 32 cm, in one example. The no-load extension/retraction speed can be 2.8 cm/sec. The vertical load-bearing capability can be approximately 13.53 N (at the extended state), which is strong enough to withstand a modest human touch force.

Note that other shape assembly mechanisms are contemplated beyond extendable reels 208. For instance, lead screws, telescopic poles (similar to motorized telescopic car antenna), and/or inflatable structures, among others, can be employed.

As mentioned above, the location assembly 204 can be manifest as a robotic base 220. In one implementation, the robotic base 220 can entail a Sony Toio. The Sony Toio is a two-wheeled robot with drive wheels 226 and Bluetooth control that interacts with an easily deployable tracking system. In addition, Toio robots have numerous potential advantages in 1) off-the shelf availability, 2) light and compact, 3) fast, 4) fairly strong, and/or 5) safe. The Toio has a built-in look-down camera 228 at the base of the robot to track the position and orientation on the guidance mechanism 108 (FIG. 1B). The camera is shown in ghost in FIG. 2B since it would be occluded from view. In this case, the guidance mechanism is manifest as a mat that is introduced and described relative to FIG. 4.

Other example robotic bases 220 can include omnidirectional robots as a base part, instead of the Toio robot. This can include Omni wheels 3 or Mecanum wheels 4 mechanisms, for example, among others. Stated another way, various implementations that employ wheels for mobility can employ, two, three, four, or more wheels and/or drive wheels.

FIG. 3 is a schematic diagram 300 of electronic components of an example HapticBot 110. The schematic diagram 300 includes the microcontroller 210, motors 214, and battery 216 introduced in FIG. 2. The schematic diagram also includes a recharging module 302 connected between the battery 216 and the microcontroller 210. The microcontroller 210 is also electrically connected to rotary encoders 304 that are coupled to the motors 214. A motor driver 306 is connected between the microcontroller 210 and the motors 214.

The microcontroller 210 can be manifest as an ESP8266 microcontroller (Wemos D1 mini, 3.4×2.5 cm) to control the two motors 214, read signals from the two rotary encoders 304, and communicate with a computer 308, such as through Wi-Fi communication with a user datagram protocol (UDP). Each module can connect to a private network and can be assigned a unique IP address. The computer 308 can send a target height to each IP address, and the microcontroller 210 can control the rotation of the motor 214 by measuring the rotation count based on the rotary encoder 304 associated with the motor. The microcontroller 210 can control one dual motor driver 306 (Pololu DRV8833 Dual Motor Driver Product No. 2130), which can control two DC motors 214 independently. The operating voltage of all modules can be 3.5V and the microcontroller can be connected to the 3.7V LiPo battery 216 (e.g., 350 mAh 652030) through recharging module 302 (e.g., TP4056). The HapticBot can be rechargeable through an external micro-USB cable.

FIG. 4 shows another HapticBots system 100A. This system can include computer 308, guidance mechanism 108, multiple HapticBots 110 (only one shown), and/or virtual headset 114. In this case, the guidance mechanism 108 can be manifest as a mat with position tracking patterns, such as a Toio Mat. The Toio Mat can include unique printed dot patterns that can be captured by the HapticBots' downward looking cameras (228, FIG. 2B). The downward looking cameras can read and identify the current position of the HapticBot 110 based on the dot pattern, enabling easy 2D tracking of the robots with no external hardware.

The virtual headset 114 can be manifest as Oculus Quest HMD, among others. This HMD has hand tracking capability for interaction with the HapticBots on the mat. HapticBots module 402 can operate on the HapticBots 110, virtual headset 114, and/or the computer 308. The HapticBots module 402 can synchronize virtual scenes (e.g., virtual 3D locations) with the physical environment (e.g., actual 3D locations), such as for each HapticBot's position, orientation, and height), so that the HapticBots can provide a haptic sensation at the proper location and in a timely manner. This section describes the design and implementation of the both hardware and software systems.

In some implementations, the HapticBots module 402 can entail JavaScript APIs to programmatically track and control the HapticBots (e.g., the location assembly 204 of FIG. 2). For instance, this tracking and control can be performed by HapticBots module on computer 308.

In one example, each location assembly (204, FIGS. 2A and 2B) has a cross-section of 3.2×3.2 cm and 2.5 cm in its height. The guidance mechanism 108 e.g., Toio Tracking Mat has 55×55 cm of covered area, but the interaction area can be easily extended with multiple mats. The resolution of 2D position and orientation detection are 1.42 mm and 1 degree, respectively, in this example. The Toio robot alone (e.g., the location assembly without the shape assembly) can drive and rotate with the maximum speed of 35 cm/sec and 1500 degrees/sec, respectively. The maximum load-bearing capacity of Toio robot is 200 g, but can move heavier objects with an appropriate caster base that can evenly distribute the weight.

The HapticBots module 402 can provide path planning and control. Based on Toio's internal tracking mechanism, the HapticBots module 402 can read and control the position and orientation of the multiple robots simultaneously. This aspect was shown and discussed above relative to FIGS. 1A-1G. This aspect is also shown and discussed below relative to FIGS. 5A and 5B.

FIG. 4 shows two example device configurations 404 that can be employed on any or all of the devices of the HapticBots system 100A, such as computer 308, HapticBot 110, virtual headset 114, and/or other devices. Individual devices can employ either of configurations 404(1) or 404 (2), or an alternate configuration. (Due to space constraints on the drawing page, one instance of each device configuration is illustrated rather than illustrating the device configurations relative to each device). Briefly, device configuration 404(1) represents an operating system (OS) centric configuration. Device configuration 404(2) represents a system on a chip (SOC) configuration. Device configuration 404(1) is organized into one or more applications 406, operating system 408, and hardware 410. The hardware 410 can include storage/memory 412 and a processor 414, among others. Other hardware 410 are described in detail above relative to FIGS. 2A and 2B and are not reintroduced here. Device configuration 404(2) is organized into shared resources 416, dedicated resources 418, and an interface 420 therebetween.

The hardware 410 can also include various input and/or output devices associated with the HapticBots. For instance, input/output devices could be positioned on various surfaces of the HapticBots 110, such as the upper surface 126 of the tiltable cap 206 (FIG. 2B). Output devices can include microphones, buzzers, voice coil actuators (VCAs), and/or heaters/coolers, among others. Input devices can include pressure sensors, force sensors, such as strain gauges, capacitive touch sensor electrodes and/or user activatable switches (e.g., triggers), among others. The hardware can also include various sensors for detecting user movement, such as inwardly-facing sensors, sensors on the HapticBots, sensors on the headset, sensors on the user, etc.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 404(2) can be thought of as a system on a chip (SOC) type design. In such a case, functionality provided by the device can be integrated on a single SOC or multiple coupled SOCs. One or more processors 414 can be configured to coordinate with shared resources 416, such as storage/memory 412, etc., and/or one or more dedicated resources 418, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, and/or other types of processing devices.

Figure 5A:
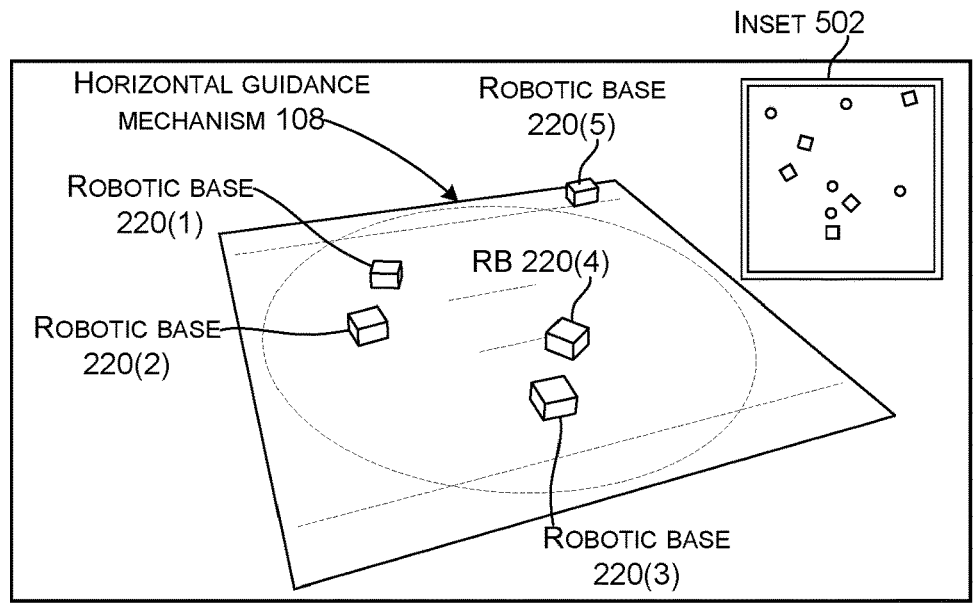
Figure 5B:
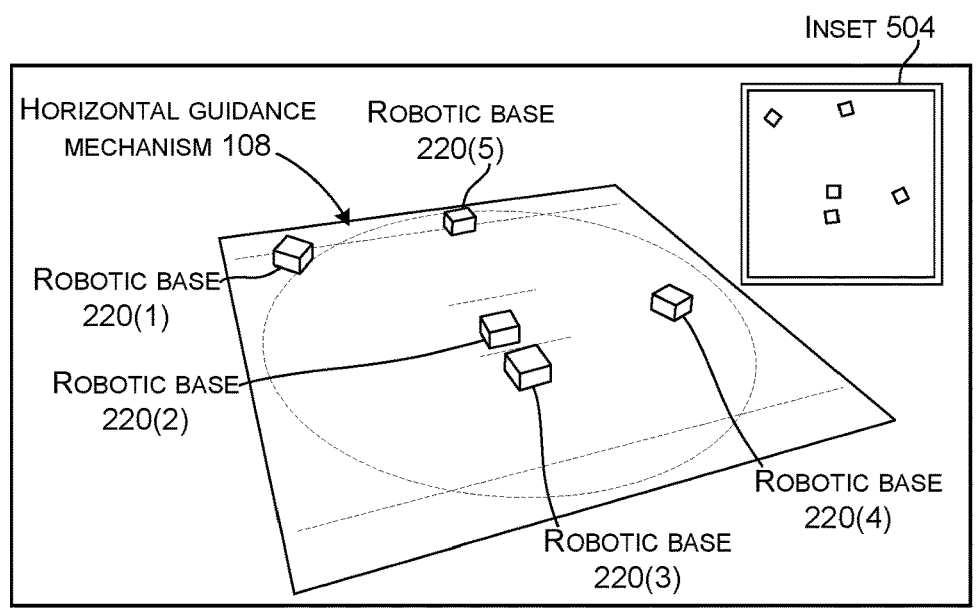

FIGS. 5A and 5B are similar to the example of FIGS. 1A-1G except that there are five HapticBots in this swarm on the guidance mechanism 108 rather than four. Note that this discussion relates to the robotic bases 220 (e.g., the location assemblies 204) and not what is happening on top of them to the shape assemblies. The robotic bases 220(1)-220(5) can be controlled and coordinated on the guidance mechanism 108 with an adaption of the Munkres algorithm for target assignment and Reciprocal Velocity Obstacles (RVO) algorithm for collision avoidance, among others. For instance, the algorithm can be supplied with the current position of each robotic base 220(1)-220(5) as shown in FIG. 5A and its target position as shown in FIG. 5B.

The algorithm first can assign each target by minimizing the total travel distance of all robotic bases 220(1)-220(5). Inset 502 of FIG. 5A shows the current location of the robotic bases 220 as 'squares' and the target locations as 'circles.' In this example, robotic bases 220(2) and 220(3) are sent to adjacent locations to collectively approximate a virtual object, such as virtual carton 118 of FIG. 1F. Robotic base 220(4) is sent to a location to approximate another virtual object, such as virtual glass 120 of FIG. 1F. Robotic bases 220(1) and 220(5) are sent to the far side of the guidance mechanism 108 (relative to the user) to avoid a collision with robotic bases 220(2)-220(4) and/or the user's hands. Inset 504 of FIG. 5B shows the current location of the robotic bases at the target locations.

Once a target is assigned, the HapticBots system can navigate the robotic bases 220 until all of the robotic bases reach their target positions, while avoiding the collisions with RVO. The driving speed can dynamically change based on the distance between the current and target position, to maximize speed when the target is far and slow it down when approaching to the target to reduce the braking distance and avoid overshooting. In this implementation, the distance to stop a moving robot is 2 mm and 5 degrees in orientation.

Looking again at FIG. 4, in some implementations, virtual reality environment and gestural tracking can be performed by an Oculus Quest HMD with its built-in hand tracking mechanism. The computer 308, such as a MacBook Pro 16 inch with Core i9 and 32 GB RAM, can function as the Node.js server. The server can control and communicate with linear actuators and the Unity application on Oculus Quest through Wi-Fi (with UDP and WebSocket protocol, respectively) and Toio robots (e.g., the robotic bases) through Bluetooth, for example. The computer 308 can communicate with each of the Toio robots through Bluetooth V4.2 (Bluetooth Low Energy). The HapticBots computer can operate at 60 FPS for tracking and control.

This implementation of the HapticBots system 100A can support four different types of user interaction: place, move, orient, and pick-up. When the user grabs a virtual object, the system stops controlling the robot and lets the user move it, so that the user can place the virtual object at a new location. This aspect was introduced above relative to FIG. 1G. By leveraging the robot's localization capability, the system can also detect where the user moves or places the HapticBot, which can be useful for remote collaboration settings (e.g., when the user moves one HapticBot, then the virtual objects and HapticBot in the remote environment can also synchronize their positions simultaneously.)

The HapticBots system 100A can also provide finger tracking and continuous positioning in some implementations. To enable the HapticBot to encounter the user's finger whenever he/she/they wishes to touch a virtual surface, one of the cameras can track the position of the user's finger. The HapticBots system can move the HapticBot to minimize the HapticBot's distance to the finger. The built-in hand tracking of the Oculus Quest can be utilized to generate the user's finger position inside the Unity virtual space. This can be accomplished by generating a reference between the Unity coordinate system and Toio's mat reference. A relatively simple calibration process can be utilized to match the coordinate systems by manually matching the center and orientation of the Toio mat with the virtual floor in the Unity scene.

Figure 6A:
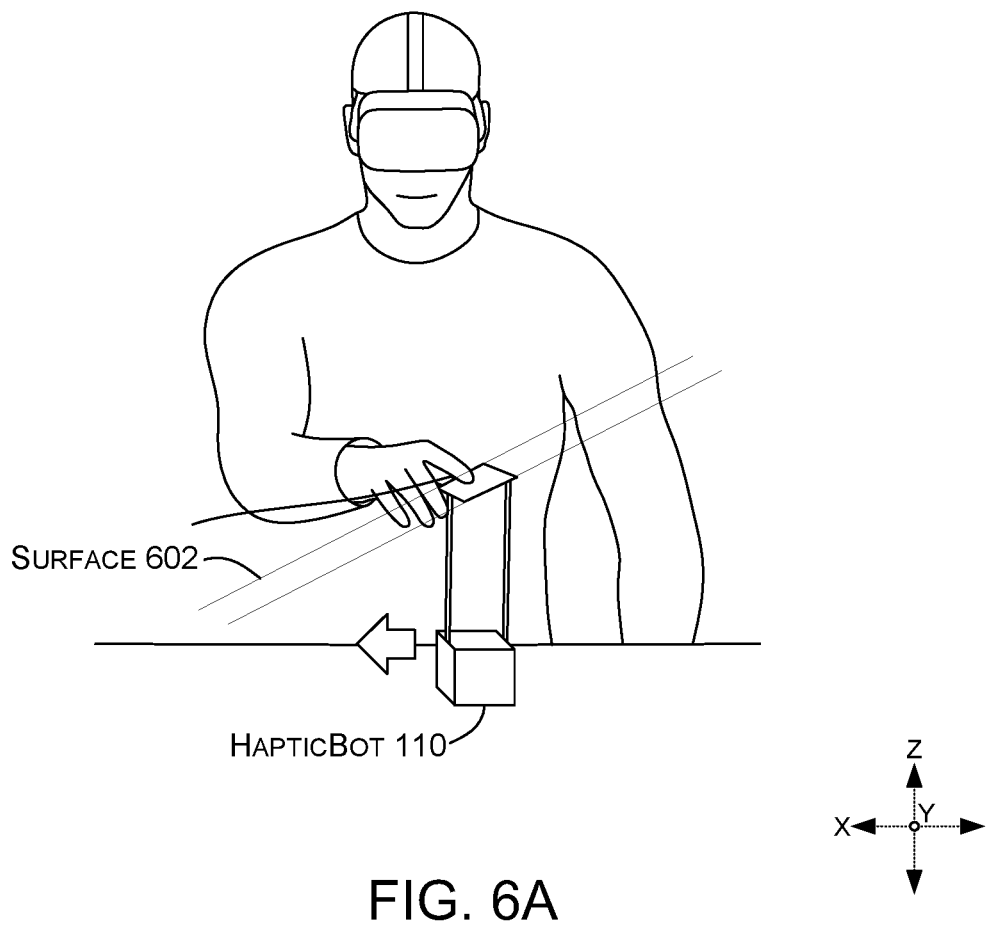
FIGS. 6A-6C, 7A, and 7B illustrate elevational views relating to example implementations of the present concepts.

The Unity game engine can approximate a virtual surface to render a virtual environment. As each HapticBot moves along the planar surface, it can constantly change its height and orientation to best fit the virtual surface above it as shown in FIG. 6A. To obtain the target height and surface normal of the robot, the system can use vertical ray casting to measure the height of the virtual contact point given its position on the horizontal surface.

Given the virtual object or surface, and the HapticBot position in Unity space (x,y, z0), where z0 is the height of the table, a ray can be cast vertically from a high elevation (above the height of the virtual geometry) (x,y, z0+H) where H is 1 meter, down until it intersects the virtual surface at (x,y, z). The distance can be obtained until the ray hits the surface $0 \le d(x,y) \le H$, which produces the height at which the HapticBot needs to render the virtual surface, with height (x,y)=z-z0=H-d(x,y). The ray casting can be performed from above and not from the robot height, to avoid culling effects, as the virtual geometry is facing up toward the user. The tilting angle of the robot's top surface (e.g., to render a tilted roof of a house), can be obtained by casting two rays, each at the locations of each actuator attachment to the plane, and change the actuator heights accordingly.

The virtual headset 114 can track the user's hands, such as at 60 Hz, and the target position can be transmitted to the corresponding HapticBot. The HapticBots system 100A can have enough bandwidth to support multiple HapticBots, such as between five and ten, for example. By leveraging the combination of hand tracking and dynamic target assignment, a small number of HapticBots can simulate a large haptic surface.

At this point, the discussion now turns to target assignment for haptic Interactions. Height measurement can be performed at each 0.5 cm grid point of the mat (55 cm×55 cm) at every 0.5 seconds. Based on this, the HapticBots system can obtain the height map (z dimensions) of the map area (xy dimensions). With this, the HapticBots system can identify regions that the HapticBot should provide a touchable plane (i.e., the region that has a surface higher than a certain height, such as beyond a 1 cm threshold). The HapticBots system can set these regions as target objects or surfaces, then move the HapticBot within this target region while the user moves his/her/their finger laterally.

Figure 6B:
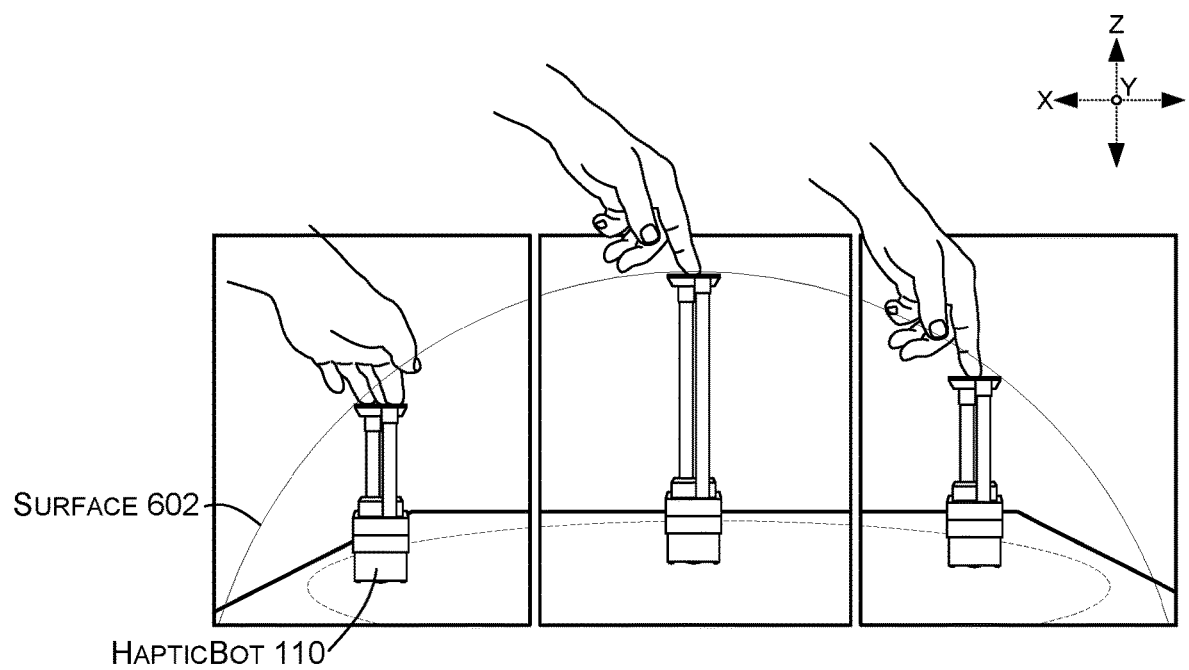
Figure 6C:
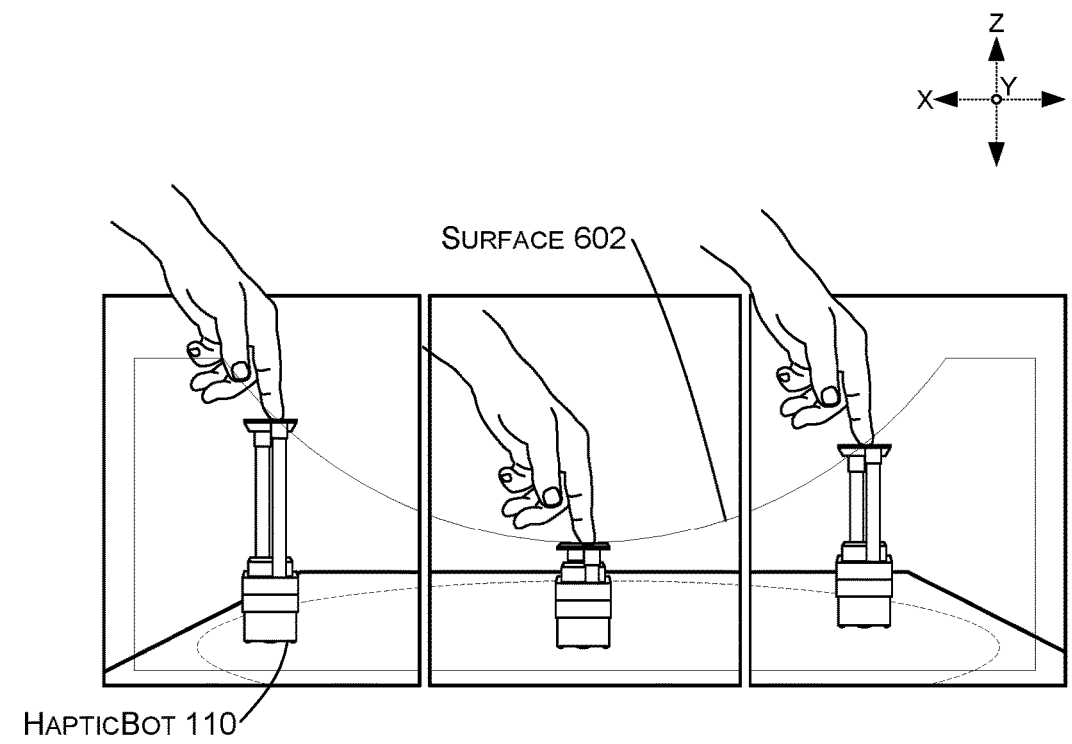

FIG. 6A shows an example where a single HapticBot approximates a large slanted surface 602 by moving the single HapticBot in the x reference direction at the same rate as the user's hand while adjusting the vertical (z direction) height to approximate the local height of the virtual object. FIG. 6B shows an example where a single HapticBot approximates a large convex surface by moving the HapticBot at a rate that equals the movement of the user's hand (e.g., keep the HapticBot at the expected location in the xy directions) while adjusting the height to approximate the expected height in the z direction. FIG. 6C is similar to FIG. 6B and shows an example where a single HapticBot approximates a large concave surface 602.

FIGS. 6A-6C show examples of how HapticBots systems can render continuous surfaces with concurrent lateral motion. Previous pin-based shape displays approximate a shape of a surface by a set of discreet pins, which generates spatial aliasing when rendering diagonal or curved objects. Particularly when sliding one's fingers over a non-horizontal surface of the shape display, the abrupt shape change of the individual pins is very noticeable. On the other hand, HapticBots systems can closely render the continuous smooth surface by leveraging the concurrent lateral motion. Using real-time tracking of the user's hands to guide the HapticBots, helps enable constant contact with the user's fingers. HapticBots can follow the movement of the user's finger and move or rotate in azimuth with the hand while changing its surface height and orientation to follow the virtual geometry.

Figure 7A:
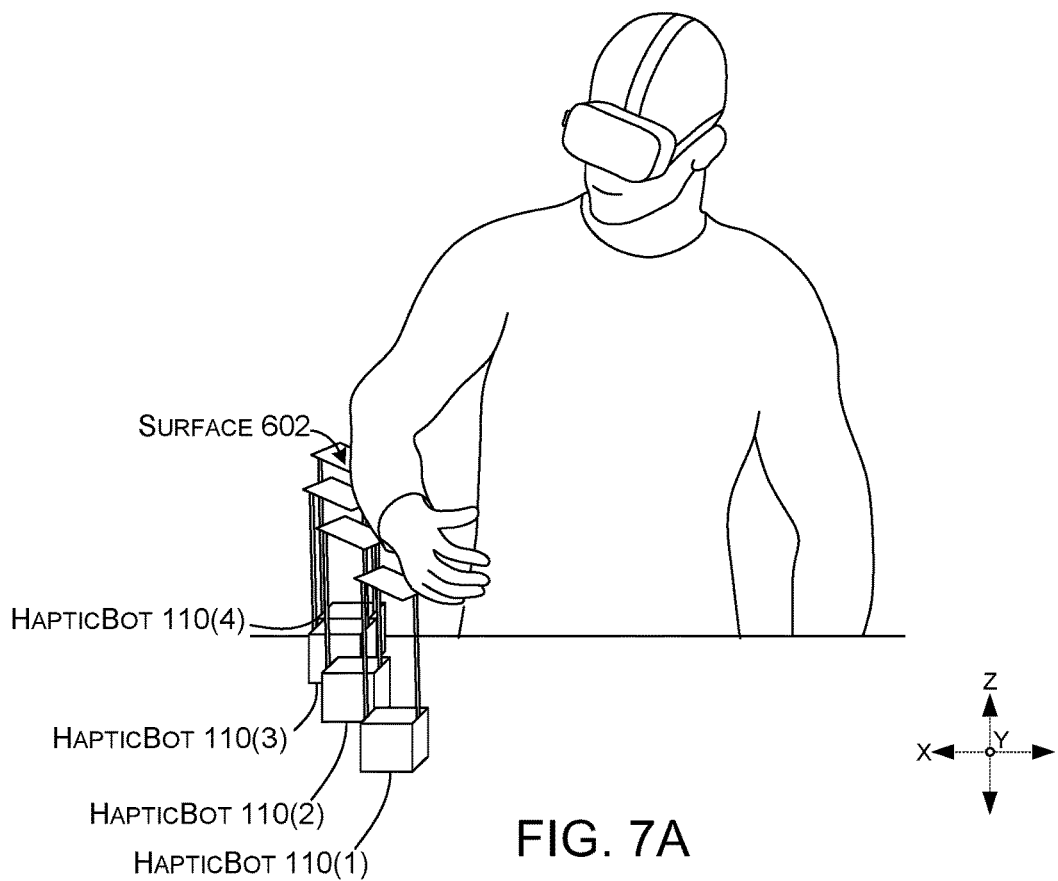

When the number of regions exceeds the number of HapticBots, the target position can be optimized based on the finger position. For example, when the HapticBots need to cover four separate target regions, the HapticBots can move across the region that is closest to the current finger position. Multiple HapticBots can also support a single large continuous region when there are enough HapticBots. Such an example is shown in FIG. 7A where four HapticBots 110(1)-110(4) move to a generally linear arrangement to collectively approximate a continuous surface contacted by the user's right forearm. This way, the target position can be assigned to each of virtual objects (e.g., virtual houses, buildings, and cars on a map), that are static (e.g., buildings) or dynamic (e.g., moving cars). By leveraging the combination of hand tracking and dynamic target assignment, the smaller number of robots can successfully simulate the virtual haptic proxy.

Figure 7B:
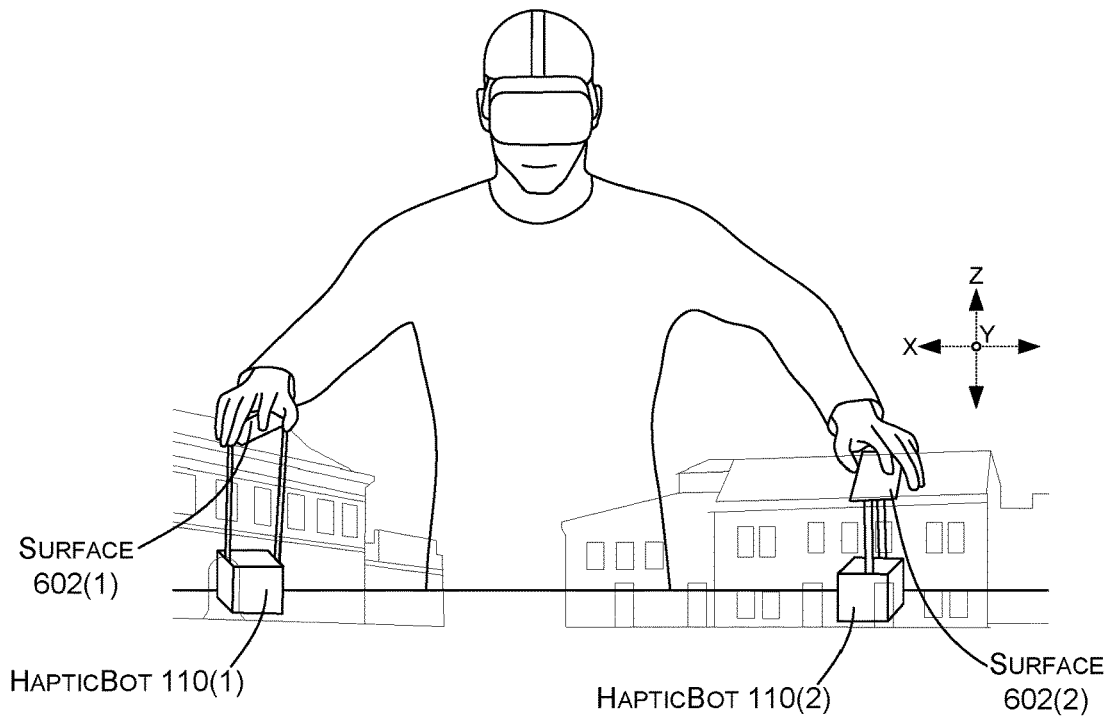

FIG. 7B shows an example of how HapticBots systems 100A can render large objects with coordinated multiple HapticBots 110(1) and 110(2). HapticBot 110(1) moves with the predicted location of the user's right hand while approximating the height and pitch (e.g., surface 602(1)) of the roof of a first virtual building. HapticBot 110(2) moves with the predicted location of the user's left hand while approximating the height and pitch (e.g., surface 602(2)) of the roof of a second virtual building.

Figure 7C:
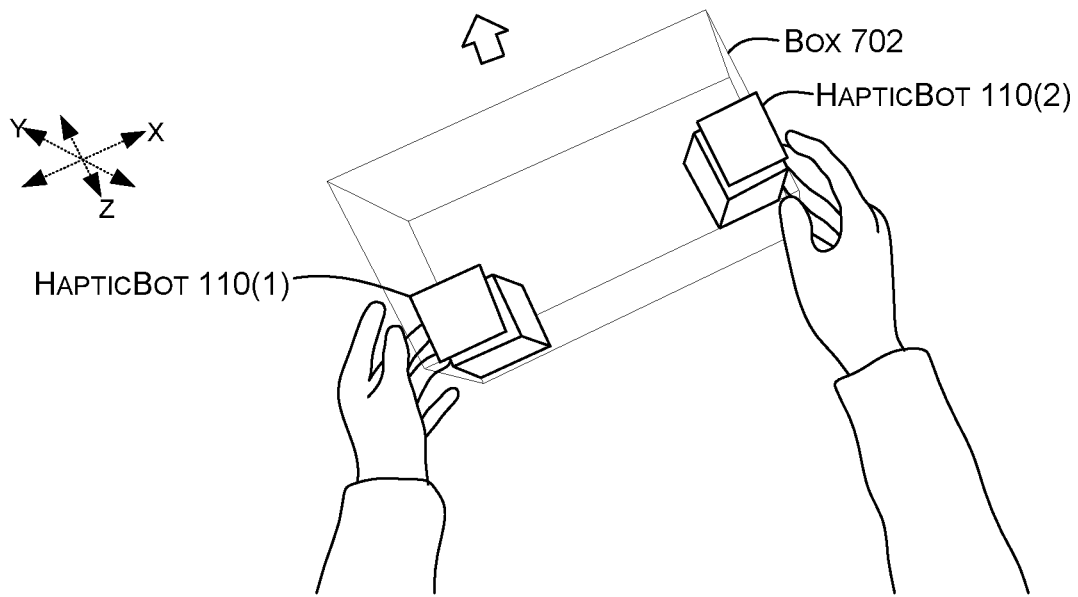

FIG. 7C shows two HapticBots 110(1) and 110(2) forming corners of a single virtual structure, such as a box 702. The user can engage the two corners to perform various actions, such as sliding the box across the reference surface. The HapticBots can provide resistance and positioning to mimic the user sensation of pushing corners of a single structure.

The coordination of multiple HapticBots can extend their rendering capabilities. For instance, this example shows multi-point interaction with two coordinated HapticBots can simulate the haptic sensation of an object (e.g., building) that is much larger than each robot. Alternatively or additionally, as shown in FIGS. 1E-1G, a group of robots can mimic a small shape display with additional degrees of freedom such as tilting and relative rotations.

Figure 8:
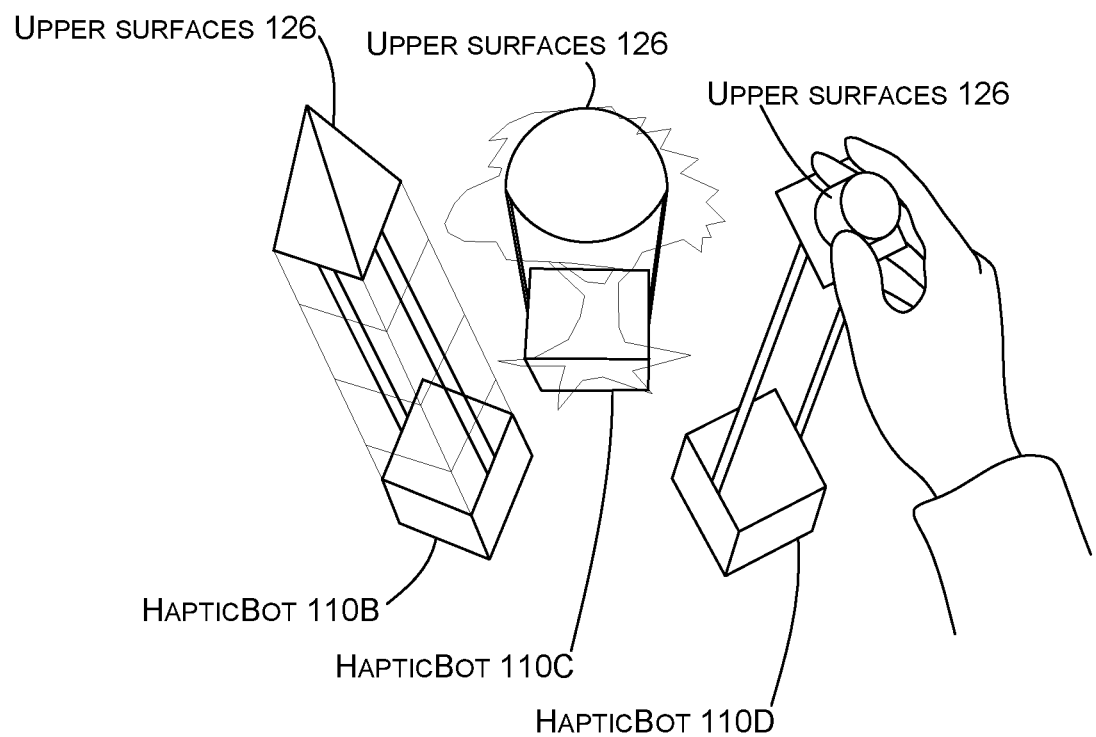

FIG. 8 shows several additional HapticBots 110B, 110C, and 110D. The variations can have different upper surfaces 126, such as multifaceted, hemispherical, or rounded, respectively to aid in simulating various virtual objects. Some implementations can employ a multi-axis tilt of the tiltable cap (206, FIG. 2B). This configuration can allow the upper surface to approximate more virtual object shapes and/or reduce rotating the location assembly (204, FIG. 2B) to get the tiltable cap at the correct orientation. HapticBots can also have mechanisms to adjust their xy dimensions (e.g., the girth).

Note that not all HapticBots in a swarm need to have the same configurations. For instance, a swarm could contain the four HapticBots shown in FIG. 1A-1G plus others, such as those shown in FIG. 8. The HapticBots system could decide which HapticBot(s) to deploy to approximate a given virtual object.

HapticBots systems 100A can also render a large number of perceived objects with a smaller number of HapticBots. The HapticBots can create the illusion that the user can touch more objects than the actual number of HapticBots by leveraging the locomotion capability and anticipation of hand movement. The HapticBots can position themselves as the object which the user will most likely encounter in the next moment. With that, the user may perceive that the entire scene is haptically rendered with these HapticBots.

The present concepts expand upon recent advances in swarm user interfaces, which leverage a swarm of robots for tangible and shape-changing interactions. Some of the previous systems have demonstrated the haptic and tactile sensation with swarm interfaces. For example, SwarmHaptics demonstrated the use of swarm robots for every day, non-VR, haptic interactions (e.g., notification, communication, force feedback) and RoboGraphics explores the tactile sensation for people with visual impairments. More recently, several works have been introduced to augment the capability of each robot to enhance interactions. For example, HERMITS augment the robots with customizable mechanical add-ons to expand tangible interactions.

Particularly, the present concepts can leverage the idea of "shape-changing swarm robots" introduced by ShapeBots. ShapeBots demonstrates the idea of combining a small table-top robot with a miniature reel actuator to greatly enhance the range of interactions and expressions for tangible user interfaces.

However, none of these works are aimed at rendering haptics of general large geometries in VR. The HapticBots systems are the first technical solutions using tabletop-size shape-changing swarm robots for VR haptics. Applying swarm UIs to VR haptics introduces a set of challenges and opportunities. For example, the prior work explicitly articulated that support for AR/VR haptics is their limitation and future work due to a number of technical challenges, including the robustness of the actuation and VR software integration. On the other hand, in VR, the user is blind to the real world, thus it is possible to render larger geometries with a small number of just in time robots. The present concepts expand this previously unexplored design space, introduce a set of haptic interactions, and address these software and hardware challenges for VR haptics applications.

As mentioned above, HapticBots systems provide a novel encountered-type haptic approach (e.g., distributed encountered-type haptics). Distributed encountered-type haptics employ multiple coordinated robots that can move their position and transform their shape to haptically render various objects and surfaces distributed in the space.

As explained above, HapticBots systems can include support for large and flexible interaction areas and a portable and deployable form factor. HapticBots systems have the ability for distributed and fast-moving HapticBots to cover a large and flexible interaction space and leverage one or two-handed interactions. Since each HapticBot can be simple and modular, HapticBots systems can easily scale the number of touch points and covered area.

HapticBots systems can employ distributed HapticBots that are composed of compact and small components, and are not bound to preset locations. HapticBots systems can leverage recent advantages of tracking systems in both the VR headset and the robot's location. For example, HapticBots can use a lightweight mat, printed with a dot pattern viewed by the HapticBots, as a tracking mechanism. Since the setup of this tracking mechanism is fairly simple, such as only placing a mat (also shown in FIGS. 1B and 4), the system can work in any flat location without dedicated external tracking devices (e.g., a transparent desk and camera or optical tracking systems). Also, in some implementations, a standalone Oculus Quest HMD or other virtual headset enables inside-out hand tracking, where the system does not require any calibrated setup. Since each HapticBot is compact, it is possible to put the entire system in a small case or backpack and quickly deploy it to another surface. HapticBots systems offer distributed encountered-type haptics that enable several haptic interactions and unique affordances.

The discussion below explains various example VR scenarios that can benefit from HapticBots implementations. HapticBots systems can be employed in various education and training scenarios. VR is an accessible way to create realistic training setups to improve skills or prepare for complex situations before they happen in real life. With its fast encounter-type approach, users of HapticBots can train their muscle memory to learn where different physical elements such as the interface of a flight cockpit are located. HapticBots can simulate continuous surfaces, and the HapticBots can follow the user's fingers as they move and even elevate them during palpation diagnostics. These features could be relevant for medical education and surgery training.

In addition to its continuous shape rendering capabilities, the design of some HapticBots implementations being based on dual actuators makes the system robust to lateral bending and provides the ability to control different tilts to render topography of a terrain surface. This enables activities like map and city exploration or terrain simulation, which can be beneficial for architectural design or virtual scene/object modeling.

HapticBots systems can be applied to remote communications. Tangible interfaces can enrich remote collaboration through shared synchronized physical objects. Using two connected HapticBots setups, can reproduce remote physical objects, or introduce shared virtual objects. For instance, a chess game application can be employed where the user moves the chess figures physically through HapticBots. As a user is replacing an opponent piece from the board, he/she/they can feel the HapticBots at the correct place on the board. This interaction could extend to multiple end points to create shared, distributed multi-user spaces.

Through its encountered-type haptic rendering approach, HapticBots can physically render information about sizes, locations and heights of objects on-demand where the user touches them. HapticBots can also enable direct interaction with the 3D models, where users can pick up and move the robots to modify objects in the terrain and to redesign the environment.

HapticBots can also be employed in gaming and/or entertainment scenarios. World-building games like Minecraft often rely on players constructing terrains and objects. However, the lack of haptics distracts from the immersive experience. HapticBots can augment the game experience during construction or game play in these VR games. Apart from the previously mentioned interactions to grab, push, and encounter, multiple HapticBots can act in coordinated ways to simulate larger objects. They can also provide proxy objects that interact with additional props and game controllers, such as an axe in Minecraft.

The illustrated HapticBots implementations employ a relatively small number of HapticBots in a coordinated swarm behavior. This small number of HapticBots can be sufficient to render various virtual objects in the example interaction space (55 cm×55 cm), as a single HapticBot can also render the continuous surface. However, some implementations can employ more HapticBots to further leverage the swarm behavior of the HapticBots and enrich the haptic interaction.

HapticBots systems are described that rely solely on HapticBots to provide haptic feedback to the user. Other implementations could use a combination of haptic mechanisms depending on the scenario encountered. For instance, the distributed encountered-type haptic interaction provided by HapticBots could be combined with other form factors, such as robot arms. The robotic arm could be selected for specific events while the HapticBots are selected for others. Still other events could be handled by HapticBots working in concert with the robot arms, for instance.

The description above explains distributed encountered-type haptics, a novel encountered-type haptic concept with tabletop shape-changing HapticBots. Compared to previous encountered-type haptics, such as shape displays and robotic arms, the present approach can improve the deployability and scalability of the system, while maintaining generalizability for general purpose haptic applications.

Figure 9:
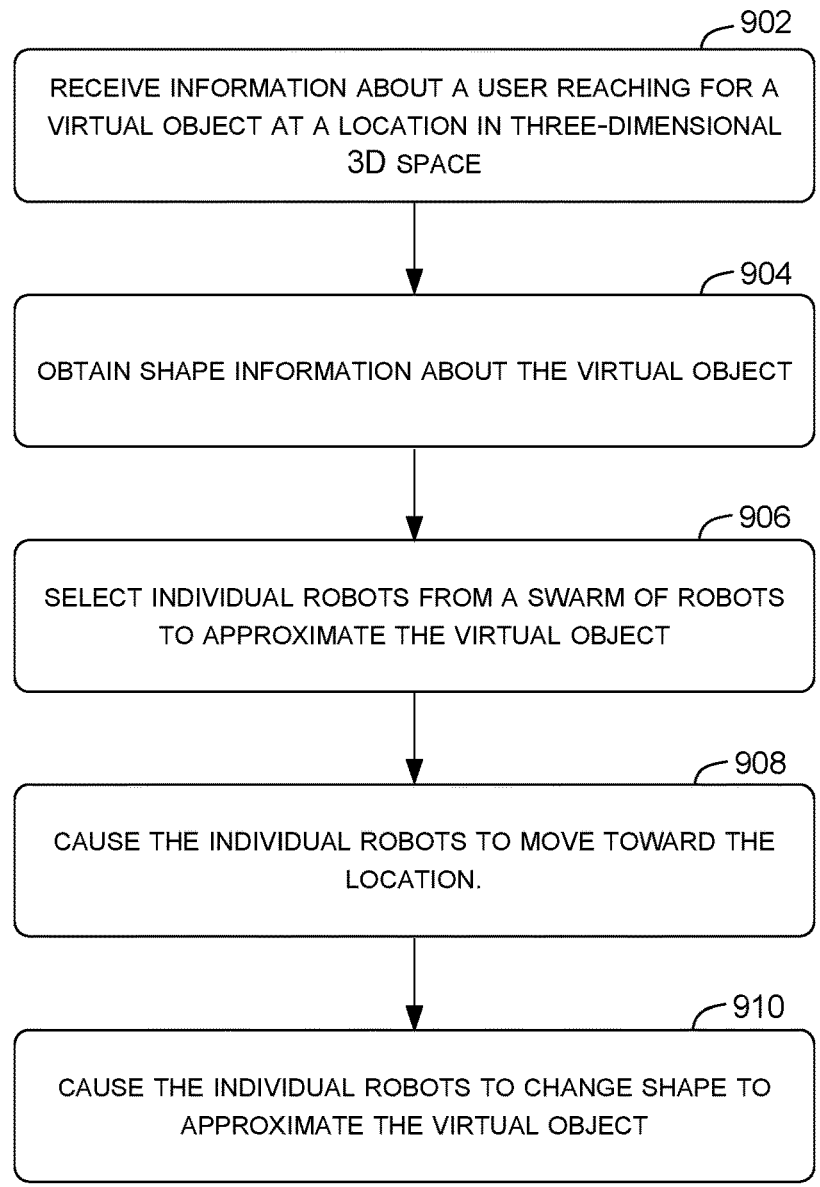
FIG. 9 shows a flowchart of an example method that is consistent with some implementations of the present concepts.

FIG. 9 shows a flowchart illustrating an example method 900. In act 902, the method can receive information about a user reaching for a virtual object at a location in three-dimensional 3D space.

In act 904, the method can obtain shape information about the virtual object. For example, a virtual application that is generating the virtual objects may include a data table or other listing of information about the virtual objects, such as size, dimensions, texture, etc.

In act 906, the method can select individual robots from a swarm of robots to approximate the virtual object.

In act 908, the method can cause the individual robots to move toward the location.

In act 910, the method can cause the individual robots to change shape to approximate the virtual object.

Although the subject matter has been described in language specific to structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

Various examples are described above. Additional examples are described below. One example includes a system comprising a virtual reality device capable of generating an image comprising a virtual object for a user, multiple independently controllable robots, and a module configured to receive a prediction that the user is reaching for the virtual object at a location, the module configured to identify a subset of the multiple robots to utilize to approximate the virtual object, to cause the subset of the multiple robots to move to the location and to change shape to be engaged by the user based at least in part upon information about the virtual object.

Another example can include any of the above and/or below examples where the virtual reality device comprises a virtual headset and wherein the virtual headset includes the module.

Another example can include any of the above and/or below examples where the system further comprises the virtual headset configured to control the multiple robots.

Another example can include any of the above and/or below examples where a computer includes the module and is configured to communicate with the virtual reality device and the multiple independently controllable robots.

Another example can include any of the above and/or below examples where each robot includes a location assembly configured to move the robot and a shape assembly configured to change the shape of the robot.

Another example can include any of the above and/or below examples where the location assembly includes a sensor and further comprising a guidance mechanism covering an array of locations and wherein the location assembly can determine a location of the robot by sensing the guidance mechanism.

Another example can include any of the above and/or below examples where the shape assembly can adjust a height of the robot, a slope of an upper surface of the robot, or a width of the robot.

Another example can include any of the above and/or below examples where each robot includes electromagnets and wherein when the subset includes more than one robot, the module can cause the electromagnets to temporally secure the robots together.

Another example includes a robotic device comprising a location assembly configured to sense a location of the robotic device on a surface and to move the robotic device on the surface and a shape assembly secured to the location assembly and configured to adjust a height and a pitch of an upper surface of the robotic device.

Another example can include any of the above and/or below examples where the location assembly comprises two drive wheels, three drive wheels, or four drive wheels that engage the surface.

Another example can include any of the above and/or below examples where the shape assembly comprises an extendable reel.

Another example can include any of the above and/or below examples where the extendable reel can be turned in one direction to extend a tape out of the reel and an opposite direction to retract the tape into the extendable reel.

Another example can include any of the above and/or below examples where the device further comprises another extendable reel comprising another tape on another reel and wherein terminal ends of the tape and the another tape are pivotably connected to a tiltable cap.

Another example can include any of the above and/or below examples where the device further comprises a microcontroller configured to extend different amounts of tape out of the extendable reel and the another extendable reel to control a pitch of the tiltable cap.

Another example includes a device implemented method comprises receiving information about a user reaching for a virtual object at a location in three-dimensional (3D) space, obtaining shape information about the virtual object, selecting individual robots from a swarm of robots to approximate the virtual object, causing the individual robots to move toward the location, and causing the individual robots to change shape to approximate the virtual object.

Another example can include any of the above and/or below examples where the receiving information comprises receiving information for a virtual headset that is presenting the virtual object for the user and tracking user movements.

Another example can include any of the above and/or below examples where the obtaining shape information comprises obtaining shape information about a size of the virtual object.

Another example can include any of the above and/or below examples where the selecting is based at least in part on the size of the virtual object and a location of the individual robots relative to the location of the virtual object.

Another example can include any of the above and/or below examples where the causing the individual robots to move comprises causing the individual robots to move on a two-dimensional (2D) plane.

Another example can include any of the above and/or below examples where the causing the individual robots to change shape comprises causing the individual robots to raise or lower upper surfaces in a third dimension that is perpendicular to the 2D plane.

Another example can include any of the above and/or below examples where the individual robots are free-standing robots that the user can pick up or push down against the 2D plane.

Another example can include any of the above and/or below examples where when the user picks up an individual robot, further comprising detecting the individual robot on the 2D plane when the user sets the individual robot back down.

The invention claimed is:

1. A system, comprising:
a virtual reality device capable of generating an image comprising a virtual object for a user;
multiple graspable independently controllable robots; and,
a module configured to receive a prediction that the user is reaching for the virtual object at a location, the module configured to identify a subset of at least two of the multiple robots to utilize to approximate the virtual object, to cause the subset of the multiple robots to move to the location and to temporarily secure to one another and to change shape to be collectively grasped by the user based at least in part upon information about the virtual object, wherein changing the shape comprises controlling a collective height, a width, and a surface angle of the subset of the multiple robots.

2. The system of claim 1, wherein the virtual reality device comprises a virtual headset and wherein the virtual headset includes the module.

3. The system of claim 1, further comprising a computer that includes the module and is configured to communicate with the virtual reality device and the multiple independently controllable robots.

4. The system of claim 1, wherein each robot includes a location assembly configured to move the robot and a shape assembly configured to change the shape of the robot.

5. The system of claim 4, wherein the location assembly includes a sensor and further comprising a guidance mechanism covering an array of locations and wherein the location assembly can determine a location of the robot by sensing the guidance mechanism.

6. The system of claim 4, wherein the multiple independently controllable robots move on a planar surface and wherein the width is measured parallel to the planar surface and the height is measured perpendicular to the planar surface.

7. The system of claim 6, wherein each robot includes electromagnets that are configured to temporally secure the robots together.

8. A device implemented method, comprising:
receiving information about a user reaching for a virtual object at a location in three-dimensional (3D) space;
obtaining shape information about the virtual object;
selecting multiple individual robots from a swarm of robots to approximate the virtual object;

causing the multiple individual robots to move toward the location;

causing the multiple individual robots to temporarily secure to one another and to change heights and upper surface angles to collectively approximate the virtual object that can be grasped by the user; and responsive to the user ceasing to grasp the multiple individual temporarily secured robots, causing the multiple individual robots to separate and disperse away from the location.

9. The method of claim 8, wherein the receiving information comprises receiving information for a virtual headset that is presenting the virtual object for the user and tracking user movements.

10. The method of claim 9, wherein the obtaining shape information comprises obtaining shape information about a size of the virtual object.

11. The method of claim 10, wherein the selecting is based at least in part on the size of the virtual object and a location of the individual robots relative to the location of the virtual object.

12. The method of claim 11, wherein the causing the individual robots to move comprises causing the individual robots to move on a two-dimensional (2D) plane.

13. The method of claim 12, wherein the changing heights and upper surface angles is measured in a third dimension that is perpendicular to the 2D plane.

14. The method of claim 13, wherein the individual robots are free-standing robots that the user can pick up or push down against the 2D plane.

15. The method of claim 14, wherein when the user picks up an individual robot, further comprising detecting the individual robot on the 2D plane when the user sets the individual robot back down.

* * * * *